(12) United States Patent
Takahashi et al.

(10) Patent No.: US 6,791,713 B1
(45) Date of Patent: Sep. 14, 2004

(54) IMAGE FORMING APPARATUS

(75) Inventors: Hiroshi Takahashi, Kanagawa (JP);
Etsuo Morimoto, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/415,061

(22) Filed: Oct. 12, 1999

(30) Foreign Application Priority Data

| Oct. 13, 1998 | (JP) | ............................................ | 10-291195 |
| Oct. 13, 1998 | (JP) | ............................................ | 10-291196 |
| Oct. 13, 1998 | (JP) | ............................................ | 10-291197 |
| Oct. 13, 1998 | (JP) | ............................................ | 10-291198 |

(51) Int. Cl.$^7$ .............................. G06K 1/00; G06F 15/00
(52) U.S. Cl. ........................ 358/1.9; 347/131; 358/3.02; 358/3.06; 358/299; 358/614; 358/300; 382/299
(58) Field of Search ......................... 358/1.9, 300, 3.02, 358/443, 448, 518, 3.01, 3.06, 3.12, 3.26, 3.27, 447, 521, 526; 382/299, 254; 399/168; 345/589, 613; 347/131, 252, 132, 247, 133, 240, 246, 254

(56) References Cited

U.S. PATENT DOCUMENTS

| 5,130,808 | A | * | 7/1992 | Kemmochi ................. | 358/1.9 |
| 5,148,287 | A | * | 9/1992 | Kemmochi et al. ........ | 358/3.03 |
| 5,325,474 | A | * | 6/1994 | Kumazaki et al. .......... | 345/611 |
| 5,471,282 | A | * | 11/1995 | Hayashi et al. ............... | 399/64 |
| 5,646,670 | A | * | 7/1997 | Seto et al. ................... | 347/131 |
| 5,801,844 | A |  | 9/1998 | Yamakawa et al. ......... | 358/450 |
| 5,831,751 | A |  | 11/1998 | Ohneda et al. ............. | 358/521 |
| 5,854,882 | A | * | 12/1998 | Wang ........................ | 358/1.9 |
| 6,016,206 | A | * | 1/2000 | Koide et al. ............... | 358/3.02 |
| 6,108,105 | A | * | 8/2000 | Takeuchi et al. .............. | 358/1.2 |
| 6,134,022 | A | * | 10/2000 | Yamamoto et al. .......... | 358/1.9 |
| 6,192,152 | B1 | * | 2/2001 | Funada et al. ............... | 382/199 |
| 6,317,220 | B1 | * | 11/2001 | Fujita et al. ................ | 358/3.12 |
| 6,369,911 | B1 | * | 4/2002 | Hattori ....................... | 358/1.9 |

OTHER PUBLICATIONS

U.S. patent application Ser. No. 10/006,377, filed Dec. 1, 2001, Related Pending Application.
U.S. patent application Ser. No. 10/347,447, filed Jan. 21, 2003, Related Pending Application.
U.S. patent application Ser. No. 09/415,061, Takahashi et al., filed Oct. 12, 1999.
U.S. patent application Ser. No. 10/378,892, Takahashi et al., filed Mar. 5, 2003.
U.S. patent application Ser. No. 09/415,061, Takahashi et al., filed Oct. 12, 1999.
U.S. patent application Ser. No. 10/391,211, Morimoto et al., filed Mar. 19, 2003.
U.S. patent application Ser. No. 09/415,061, Takahashi et al., Oct. 12, 1999.
U.S. patent application Ser. No. 10/347,447, Ogawa et al., Jan. 21, 2003.
U.S. patent application Ser. No. 09/415,061, filed Oct. 12, pending.
U.S. patent application Ser. No. 10/006,377, filed Dec. 10, pending.
U.S. patent application Ser. No. 08/043,736, filed Apr. 7, 1993, abandoned.
U.S. patent applcation Ser. No. 09/098,734, filed Jun. 18, 1998, allowed.
U.S. patent application Ser. No. 09/415,061, filed Oct. 12, pending.

* cited by examiner

*Primary Examiner*—Kimberly Williams
*Assistant Examiner*—Melanie Vida
(74) *Attorney, Agent, or Firm*—Oblon, Spivak, McClelland, Maier & Neustadt, P.C.

(57) ABSTRACT

An image forming apparatus adds a plurality of dots of image date in the subscanning direction and starts generating a density from a particular pixel, and switches PWM (Pulse Width Modulation) right and left phases in order to concentrate potentials and to increase a saturation region. It is therefore possible to stabilize image density in a highlight portion and therefore realize high quality images, while reducing banding and image noise.

17 Claims, 30 Drawing Sheets

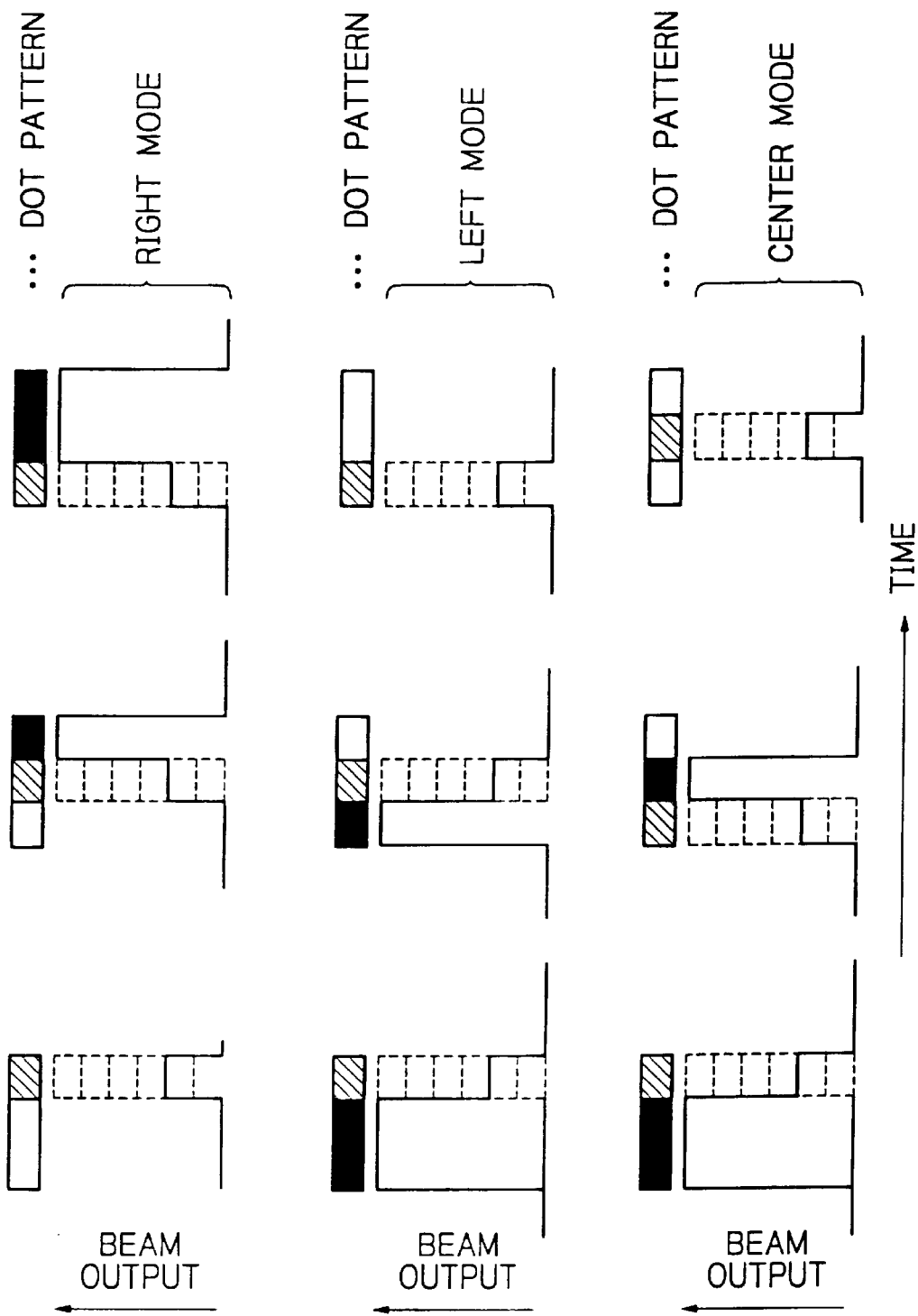

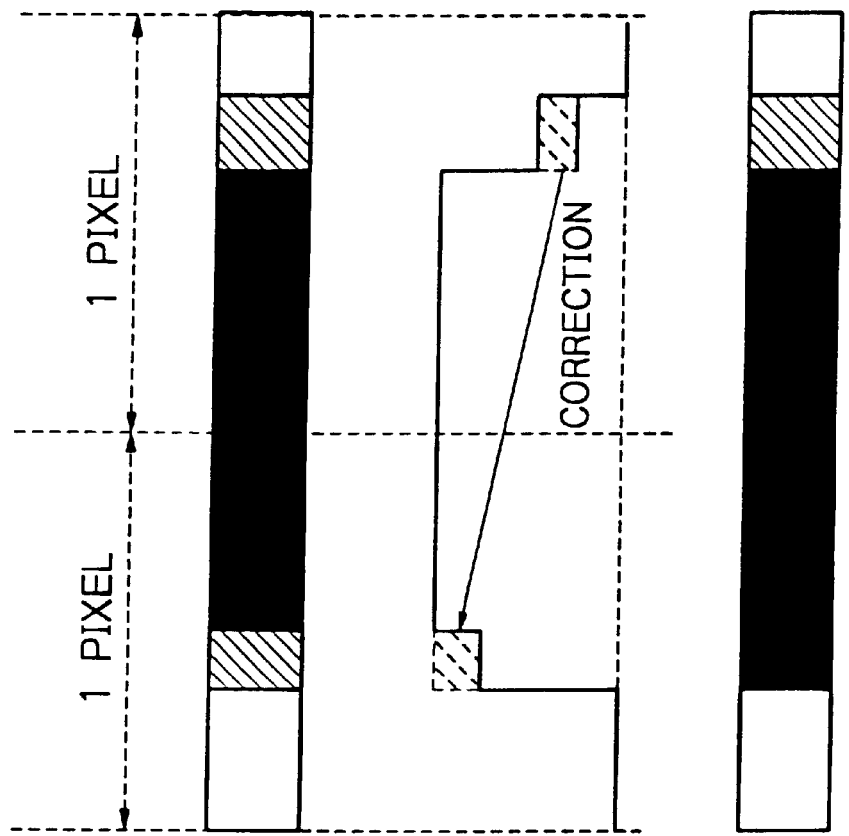

LOW DENSITY PORTION

MEDIUM/HIGH DENSITY PORTION

1 DOT SIZE

UP TO 1/8 (2 SOLITARY DOTS)

UP TO 1/4 (2 SOLITARY DOTS)

UP TO 3/8 (300 LINE SPOTS)

UP TO 1/2 (300 LINE SPOTS)

UP TO 5/8

UP TO 3/4

UP TO 7/8

UP TO 1/8 (1 SOLITARY DOT)

UP TO 1/4 (1 SOLITARY DOT)

UP TO 3/8 (300 LINE SPOTS)

UP TO 1/2 (300 LINE SPOTS)

UP TO 5/8

UP TO 3/4

UP TO 7/8

UP TO 5/8

UP TO 3/4

MAIN SCANNING DIRECTION

SUBSCANNING DIRECTION

UP TO 1/2

UP TO 5/8

1 DOT SIZE

1 PIXEL SIZE (MIN DENSITY UNIT)

MAIN SCANNING DIRECTION

SUBSCANNING DIRECTION

MAIN SCANNING DIRECTION

SUBSCANNING DIRECTION

UP TO 1/8 (1 SOLITARY DOT)

UP TO 1/4 (1 SOLITARY DOT)

UP TO 3/8 (300 LINE SPOTS)

UP TO 1/2 (300 LINE SPOTS)

UP TO 5/8

UP TO 3/4

UP TO 7/8

1 DOT SIZE

<DENSITY BELOW 1/4>

1 PIXEL SIZE (2 * 2) IN MAX HIGHLIGHT PORTION BELOW 1/4

MAIN SCANNING DIRECTION

SUBSCANNING DIRECTION

Fig. 31
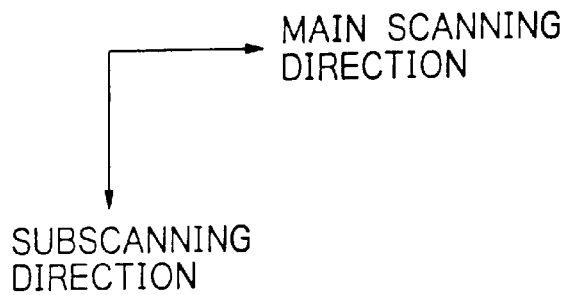
Fig. 32
<DENSITY ABOVE 1/4>
| $D_1$ | $D_2$ | — 1 PIXEL SIZE (2 * 1) FOR DENSITY ABOVE 1/4
Fig. 33
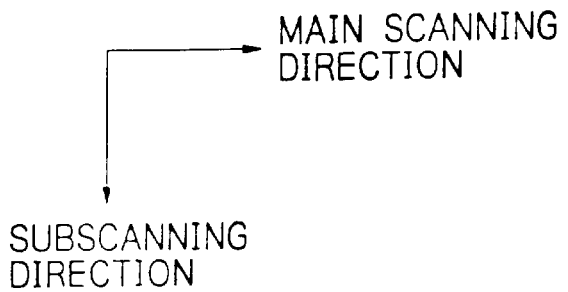

UP TO 1/16 (1 SOLITARY DOT)

UP TO 1/8 (1 SOLITARY DOT)

UP TO 3/16 (2 SOLITARY DOTS)

UP TO 2/8 (2 SOLITARY DOTS)

UP TO 3/8 (300 LINE SPOTS)

UP TO 1/2 (300 LINE SPOTS)

UP TO 5/8

UP TO 3/4

UP TO 7/8

ADDITION OF PIXEL DATA IN SUBSCANNING DIRECTION

ADDITION OF PIXEL DATA IN MAIN SCANNING DIRECTION

1×2 MATRIX

2×1 MATRIX

1×2 MATRIX

2×1 MATRIX

1×2 MATRIX
PHASE CONVERSION

2×1 MATRIX
PHASE CONVERSION

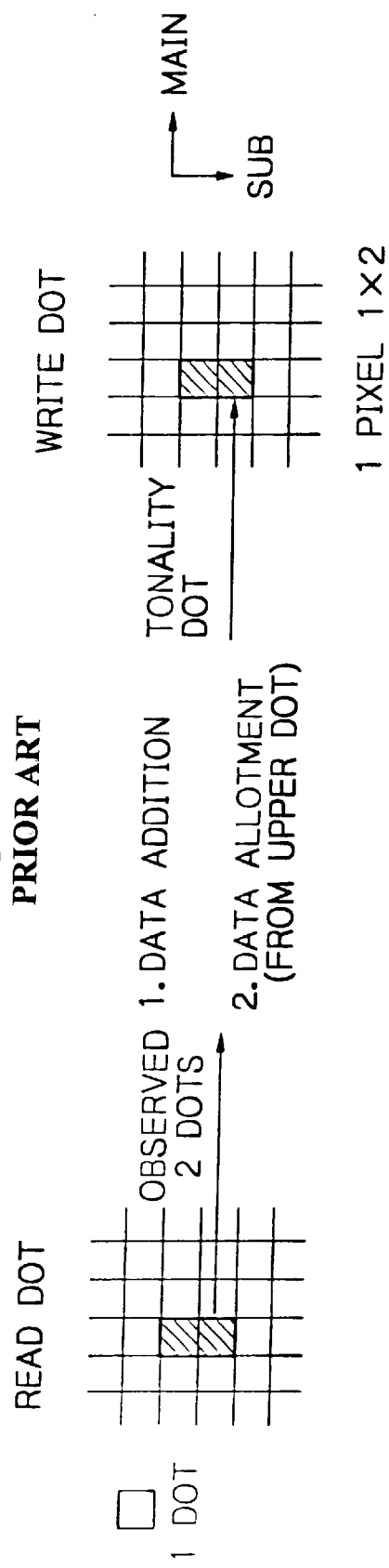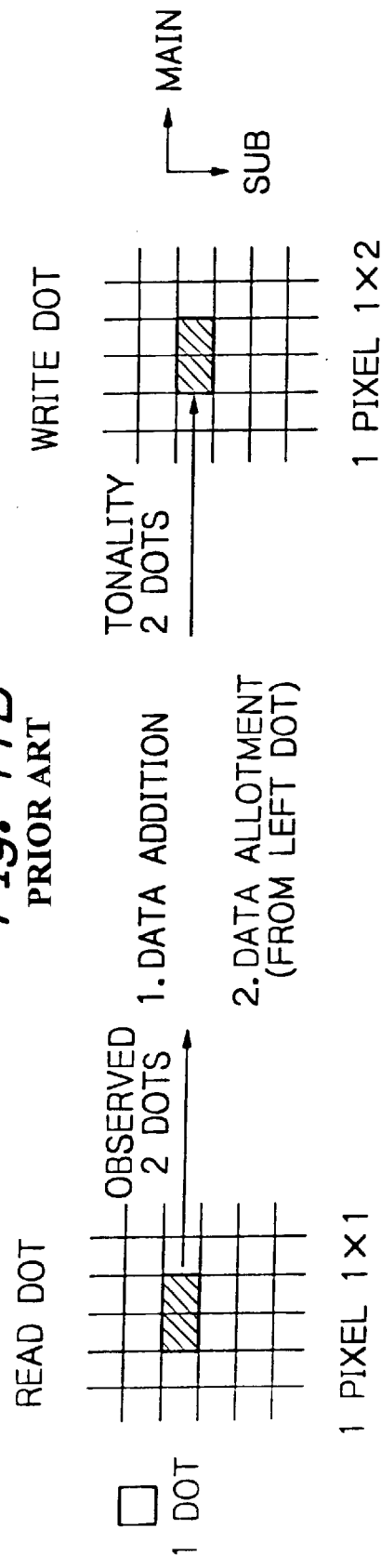
Fig. 41A PRIOR ART
Fig. 41B PRIOR ART

IMAGE FORMING APPARATUS

BACKGROUND OF THE INVENTION

The present invention relates to an image forming apparatus applicable to a laser printer, facsimile apparatus or similar digital image forming apparatus or a display. More particularly, the present invention relates to an electrophotographic color copier, color printer or similar color image forming apparatus for stably starting reproducing the highlight portion of an image frog low density and enhancing the resolution and stability of a medium to a high density portion.

Generally, an electrophotographic image forming apparatus scans a photoconductive element with a laser beam for forming a latent image on the element and develops the latent image with toner. This kind of apparatus is implemented as, e.g., a digital copier, a laser printer or a facsimile apparatus. Today, an electrophotographic copier, printer or similar color image forming apparatus is also available for forming a full-color image. It is necessary with a color image forming apparatus to improve the reproducibility of dots and line dots in a low density portion and to enhance the stability of tonality and color reproducibility against environment.

Japanese Patent Laid-Open Publication Nos. 7-254985, 7-254986, 7-283942, 8-114956 and 8-125863, for example, disclose various technologies relating to halftone processing essential with a color image forming apparatus and mainly directed toward the reproducibility of a highlight portion. Specifically, the technologies taught in the these documents each use PWM (Pulse Width Modulation) for a writing purpose and execute dither processing weighted by two dots in the main scanning direction, thereby stably reproducing a highlight portion with a small number of lines. In addition, the above technologies define a beam diameter and a pixel distance in the main scanning direction for the stable reproduction of a highlight portion. However, the dither processing fails to faithfully reproduce density in a fine area and therefore causes image data to be lost, e.g., causes a line to disappear and brings about a color moire problem.

Japanese Patent Laid-Open Publication Nos. 4-200075, 4-200076, 4-200077, 4-200078, 5-284339, 5-292302 and 6-82248, for example, teach technologies for reducing banding and image noise and thereby stabilizing image density by use of a two-dot multilevel system. The two-dot multilevel system is the combination of multilevel writing using one-dot modulation and a fine matrix involving a minimum of fall of resolution. These technologies are applicable to, e.g., a digital copier and characterized by adding the density data of two nearby dots and distributing the resulting sum. More specifically, a matrix having two dots in the main and/or the horizontal direction is combined with one-dot, 256 tonality derived from the multilevel modulation of a semiconductor laser. This is successful to further enhance the reproducibility of a halftone density range. The present invention constitutes an improvement over this kind of scheme.

SUMMARY OF THE INVENTION

It is therefore an object of the present invention to provide an electrophotographic copier, printer or similar image forming apparatus capable of stably starting reproducing the highlight portion of an image from low density and giving priority to resolution and stability in a medium to a high density portion.

An apparatus for forming an image by modulating a multilevel image signal of the present invention includes an optics for executing optical modulation including at least PWM, a calculating section for performing calculations with image data of nearby pixels, a density generating section for starting generating a density from a particular pixel on the basis of data output from the calculating section, a first replacing section for replacing the particular pixel in the main scanning direction, and a second replacing section for replacing the particular pixel in the subscanning direction.

BRIEF DESCRIPTION OF THE DRAWINGS

The above and other objects, features and advantages of the present invention will become more apparent from the following detailed description taken with the accompanying drawings in which:

FIGS. 5A–5C are charts showing pulse position control for the multilevel modulation of a semiconductor laser;

FIGS. 6A–6C are views demonstrating a mode in which nearby pixels are added;

FIGS. 77A–17C are views also showing how the procedure 2 forms dots;

FIG. 31 is a view showing a minimum density unit included in the matrix of the procedure 6 applicable to the above density;

FIG. 32 is a view showing a single pixel size (minimum density unit) included in the procedure 6 and applicable to densities above ¼;

FIG. 33 is a view showing a minimum density unit included in the matrix of the procedure 6 and applicable to densities above ¼;

FIG. 3B is a view showing how the procedure 6 forms dots when density is ⅞;

FIGS. 41A and 41B are views showing the combination of a two-dot sum image and area tonality in the main and/or subscanning direction.

DESCRIPTION OF THE PREFERRED EMBODIMENTS

To better understand the present invention, brief reference will be made to conventional image forming technologies. First, reference will be made to FIGS. 39A–39D, 40, 41A and 41B for describing two different optical writing systems using a 1×2 matrix and a 2×1 matrix, respectively. It is to be noted that the systems to be described are implemented only by PW (Power Modulation) for simplicity.

Figure 38A:
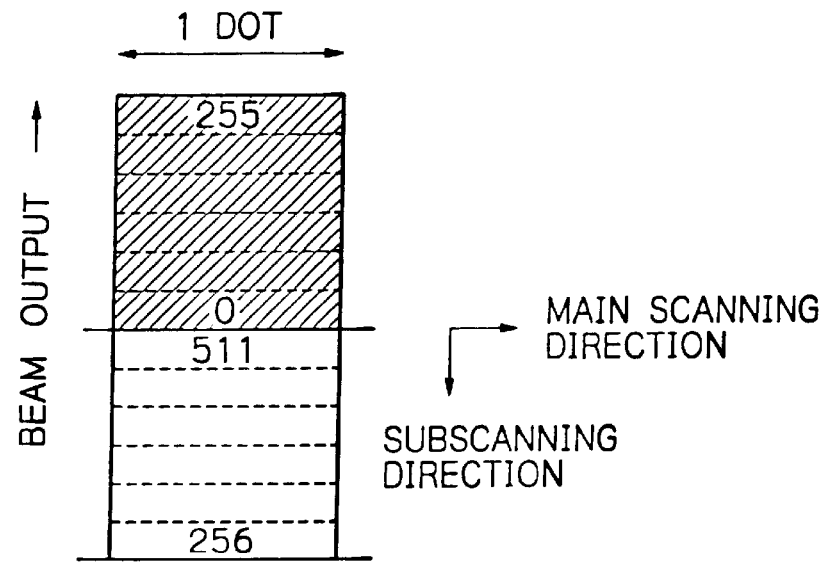
FIGS. 38A and 38B are views showing optical writing systems using a 1×2 matrix and a 2×1 matrix, respectively.
Figure 38B:
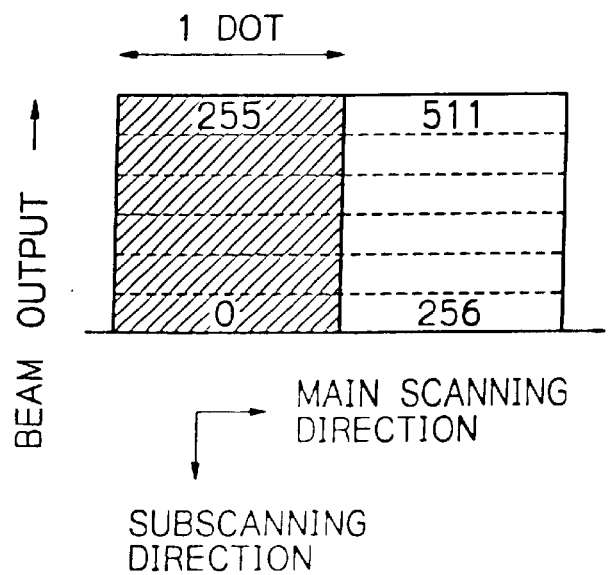

As shown in FIG. 38A and 38B, in a low density portion, the systems using a 1×2 matrix and a 2×1 matrix each start increasing exposure power at one of two dots and then increases, when the above power becomes maximum, exposure power of the next dot. The systems each reproduce an image while holding the density of two dots as a single pixel. This successfully stabilizes density and reduces banding.

Figure 39A:
FIGS. 39A–39D are charts showing halftone regions in the 1×2 matrix and 2×1 matrix.
Figure 39B:
Figure 39C:
Figure 39D:

FIGS. 39A–39D show halftone density regions derived from the 1×2 matrix and 2×1 matrix; even dots are filled up first. The 1×2 matrix shown in FIGS. 39A and 39C implements area tonality in the subscanning direction and basically forms a horizontal line in a halftone density region. The 2×1 matrix shown in FIGS. 39B and 39D implements area tonality in the main scanning direction and basically forms a vertical line in a halftone density region. When the writing phases of FIGS. 39A and 39B are altered as shown in FIGS. 39C and 39D, respectively, even dots adjoin each other; the 1×2 matrix and 2×1 matrix form two-dot lines in the main scanning direction and subscanning direction, respectively.

Figure 40:
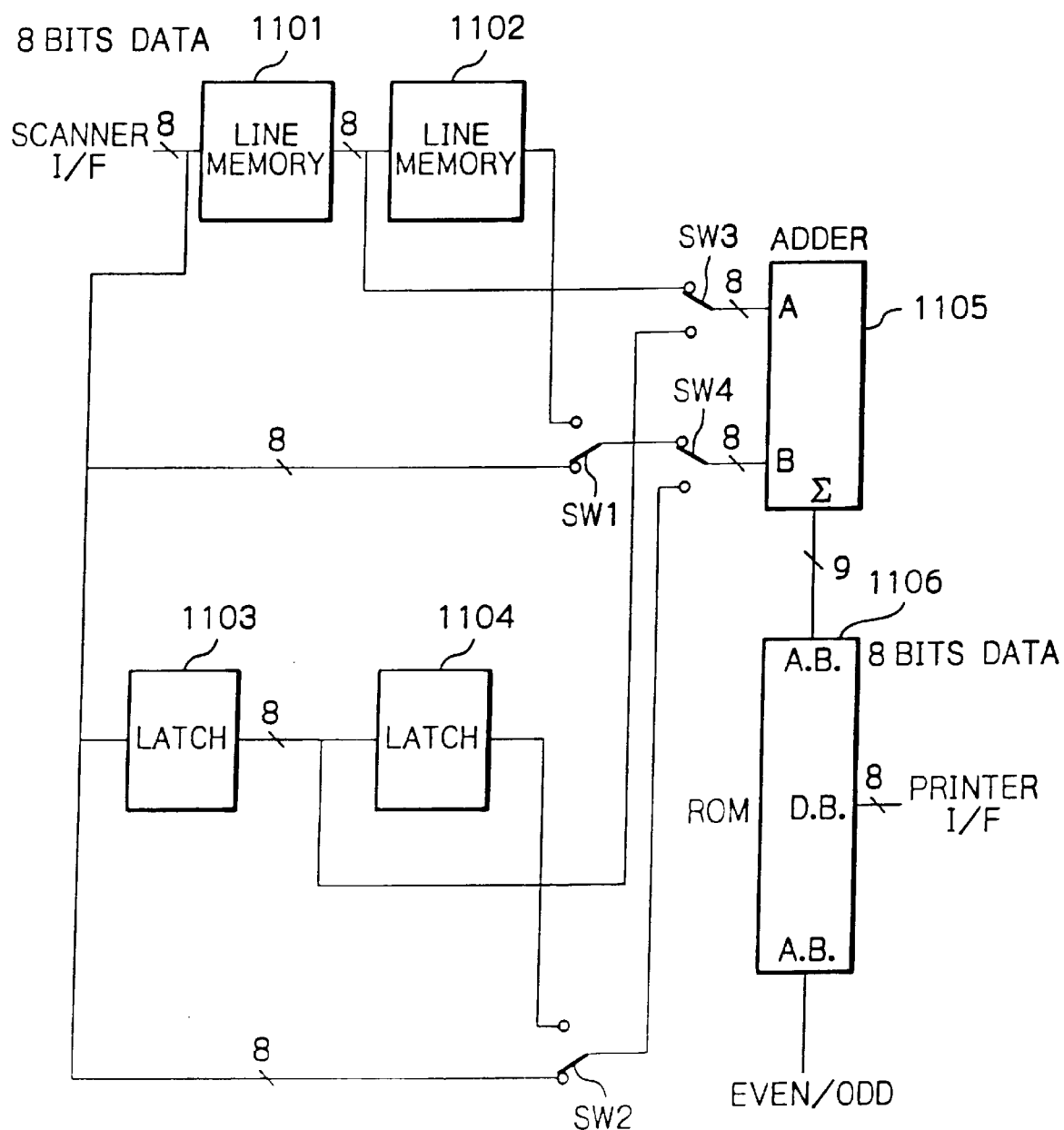
FIG. 40 is a block diagram schematically showing two dots, multilevel circuitry for effecting addition and phase control.
Figure 42:
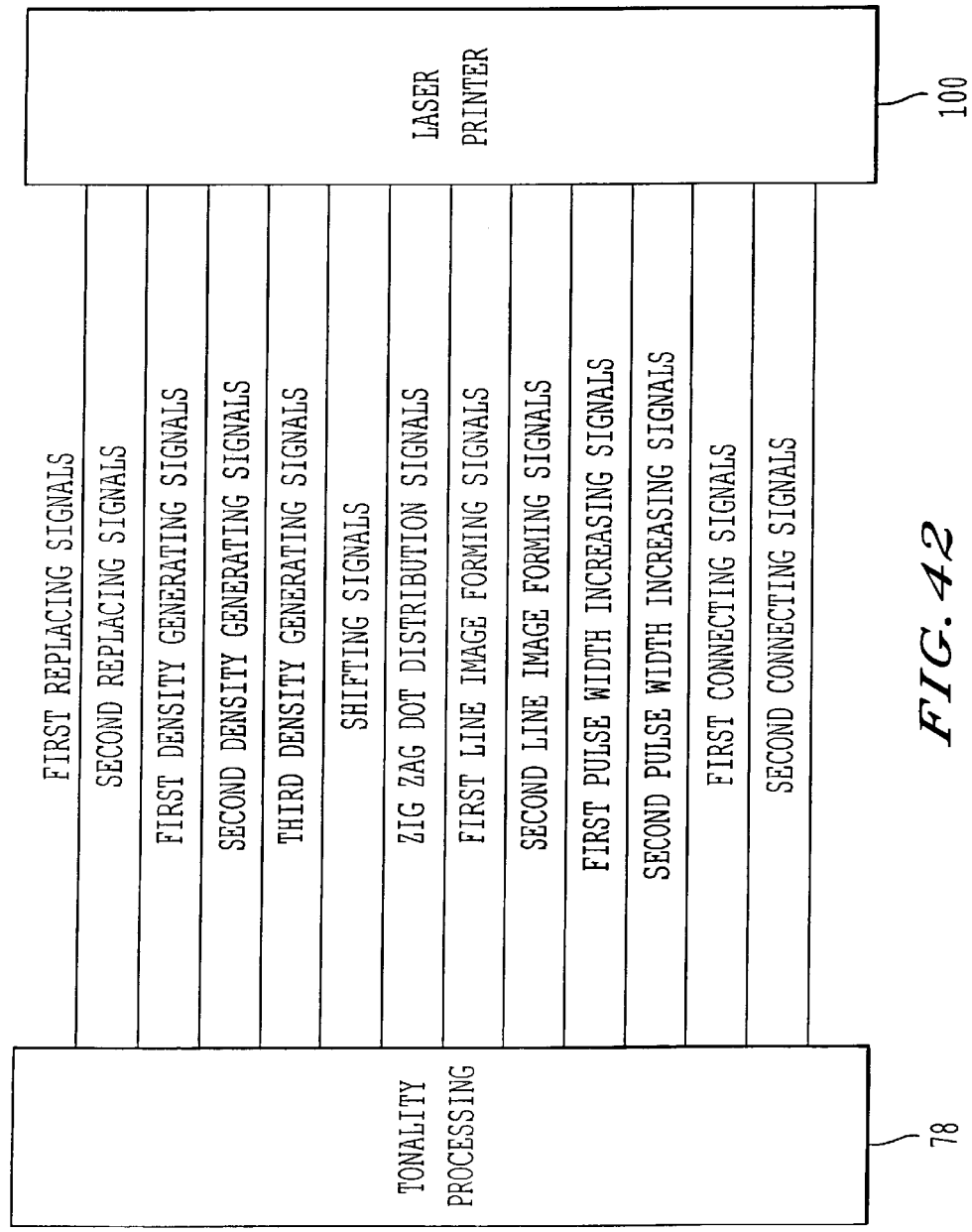
FIG. 42 is a view showing various logic signals transmitted to the printer.

FIG. 40 shows specific circuitry included in the image processing section of an image forming apparatus for controlling the addition of image data of nearby dots. The circuitry is implemented as two dots, multilevel circuitry. As shown, the circuitry includes serially connected line memories 1101 and 1102 for receiving eight-bit data from an image scanner, not shown, latches 1103 and 1104, an adder 1105 connected to the line memories 1101 and 1102 and latches 1103 and 1104 via switches SW1–SW4, and a ROM (Read Only Memory) 1106 connected to the adder 1105. Eight-bit digital image data output from the ROM 1106 are sent to a laser printer via a printer interface (I/F). The operation of the specific circuitry will be described hereinafter.

As for the 1×2 matrix, i.e., to implement area tonality with two dots contiguous in the subscanning direction, the line memories 1101 and 1102 delay two lines of data contiguous in the main scanning direction, The adder 1105 adds the two sequences of eight-bit data and writes nine-bit data in the ROM 1106 adapted for gamma conversion. In the ROM 1106, a single table has 1,024 bytes and allocates the former 512 bytes to even data and allocates the latter 512 bytes to odd data.

The first sum data is input to the address bus of the ROM 1106, and even data designated by the address of the sum data is output as data to be written. At the next line, the same data area added, and odd data is output as data to be written via the data bus. The even data and odd data are switched in synchronism with a line period (PMSYNC). Subsequently, the operation advances to the next two dots.

In FIG. 40, the switch SW1 and even/odd are switched every horizontal scanning line while the switches SW3 and SW4 are so positioned as to select the data output from the line memories 1101 and 1102, respectively. FIG. 41A shows the combination of the 1×2 dot matrix and area tonality in the subscanning direction; two dots in the subscanning direction to be read correspond to two dots in the subscanning direction to be written.

To implement area tonality with two dots contiguous in the main scanning direction, i.e., with the 2×1 matrix, the latches 1103 and 1104 delay two dots of data contiguous in the main scanning direction. This is followed by addition and gamma conversion as in the case with the 1×2 matrix. Even and odd data are switched in synchronism with a write clock WCLOCK. Subsequently, the operation advances to the next two dots.

In FIG. 40, the switch SW2 and even/odd are switched every horizontal scanning line while the switches SW3 and SW4 are so positioned as to select the data output from the latches 1103 and 1104, respectively. FIG. 41B shows the combination of the 2×1 dot matrix and area tonality in the main scanning direction; two dots in the main scanning direction to be read correspond to two dots in the main scanning direction to be written.

When an image is formed by addition plus phase conversion shown in FIG. 39C or 39D in order to cause dots to concentrate, the even/odd switching period is halved in frequency. In this manner, tonality data are not lost in any one of the different modes, so that the reproducibility of a halftone density region can be improved.

Figure 1:
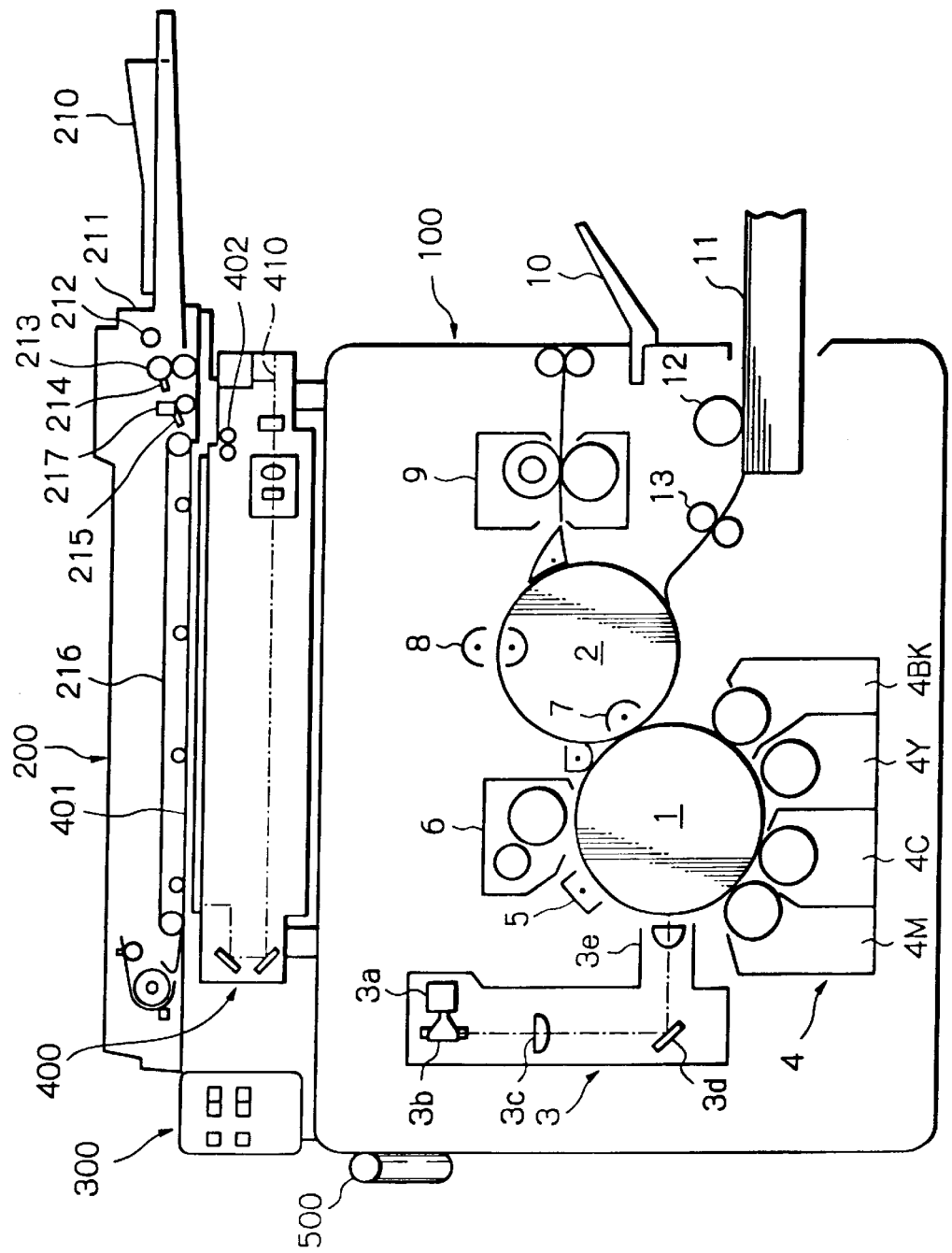
FIG. 1 is a view showing an image forming apparatus in accordance with the present invention implemented as a digital color copier by way of example.

The present invention will be described with reference to the accompanying drawings under the following heads:

(I) Image Formation of Color Copier (II) Image Processing of Color Copier (III) LD Multilevel Modulation (IV) Circuitry for Addition Control and Phase Control (V) Dot Formation by Addition, Allotment and Phase Control (I) Image Formation of Color Copier Referring to FIG. 1, an image forming apparatus embodying the present invention is shown and implemented as a digital color copier by way of example. As shown, the copier includes a laser printer or image forming section 100, an ADF (Automatic Document Feeder) 200, an operation board 300, an image scanner or image reading section 400, and a sensor 500 removably mounted on the laser printer 100.

The image scanner 400 includes a carriage positioned below a glass platen 401 and loaded with a lamp 402. The carriage is mechanically moved at a constant speed in the right-and-left direction (subscanning direction), as viewed in FIG. 1, for reading a document laid on the glass platen 401. Specifically, light issuing from the lamp 402 is reflected by the surface of the document in accordance with the density of the document. The resulting imagewise reflection is incident to a dichroic prism 410 via a number of mirrors and a lens. The dichroic prism 410 separates the incident light into three color components R (red), G (green) and B (blue) on the basis of wavelength. The R, G and B components each are incident to a particular monodimensional CCD (Charge Coupled Device) image sensor 410. Therefore, three image sensors 410 read one line of R, G and B components of the document image at the same time in the main scanning direction. The bidimensional document image is sequentially read by the movement of the carriage in the subscanning direction.

The sensor 500 is built in a handy scanner implemented by CCDs capable of sensing R, G and B components at the same time like the fi image scanner 400. The sensor 500 may be implemented by three-line CCD sensor having R. G and B line sensors, if desired.

The ADF 200 is mounted on the top of the image scanner 400 and includes a document tray 210 to be loaded with a stack of documents. To feed a document, a pickup roller 212 rotates in contact with the top of the stack in order to pay out the top document. A separation roller 213 prevents two or more documents from being paid out at the same time. The document paid out to a preselected position is further conveyed along the glass platen 401 by a pullout roller 217 and a belt 216. When the document reaches a preselected reading position on the glass platen 401, i.e., when the leading edge of the document reaches the left edge of the glass platen 401, as viewed in FIG. 1, the document is brought to a stop. After the entire document has been read, the belt 216 is again driven to convey the document away from the glass platen 401 while conveying the next document toward the glass platen 401. A document sensor 211 is positioned upstream of the pickup roller 212 in the direction of pay-out for determining whether or not documents are present on the tray 210. A sensor 214 for sensing the leading edge and size of the document paid out is positioned between the separation roller 213 and the pullout roller 217.

The sensor 214 is implemented by a plurality of sensors arranged at different positions in the main scanning direction perpendicular to the sheet surface of FIG. 1. A document size in the main scanning direction, i.e., a document width is determined on the basis of the combination of the outputs of the above sensors. A pulse generator mounted on the output shaft of a paper feed motor outputs pulses in accordance with the rotation of the motor although not shown specifically. A control unit, not shown, included in the ADF 200 counts a period of time in which the document moves away form the sensor 214, thereby determining a document size in the subscanning direction, i.e., a document length.

The pickup roller 212 and separation roller 213 are driven by the paper feed motor while the pullout roller 217 and belt 216 are driven by a conveyance motor not shown. An optical registration sensor 215 is positioned downstream of the pullout roller 217 in the direction of pay-out.

The laser printer 100 includes a photoconductive drum 1. Arranged around the drum 1 are various process units for implementing an electrophotographic process, i.e., a main charger 5, a writing unit 3, a developing unit 4, a transfer drum 2, a cleaning unit 6, etc. The writing unit 3 includes a semiconductor laser or LD (Laser Diode). A beam issuing from the laser is incident to the surface of the drum 1 via a rotatable polygonal mirror 3b, a lens 3c, a mirror 3d, and a lens 3e. A motor 3a causes the polygonal mirror 3b to rotate at a constant high speed.

The laser is driven by pixel-by-pixel multilevel image signals representative of the density of an image to be recorded. An image controller, not shown, controls a drive signal for the laser such that the emission timing of the laser is synchronous to the operation of the polygonal mirror 3b for sequentially scanning the consecutive pixel positions. This allows the laser beam to scan each image scanning position on the surface of the drum 1 in accordance with a particular pixel density.

The main charger 5 uniformly charges the surface of the drum 1 to a high potential by corona discharge. The laser beam incident to the charged surface of the drum 1 causes the charge potential to vary in accordance with the intensity of the beam. As a result, a charge distribution based on the presence/absence of the laser emission is formed on the drum 1. That is, a latent image representative of the tonality of the document image is electrostatically formed on the drum 1. The developing unit 4 located downstream of the writing unit 3 develops the latent image.

In the illustrative embodiment, the developing unit 4 includes four developing sections 4M (magenta), 4C (cyan), 4Y (yellow) and 48k (black) storing M toner, C toner, Y toner and Bk toner, respectively. The laser printer 100 is so constructed as to selectively drive the developing sections 4M–4Bk, so that the above latent image is developed by one of the M, C, Y and Bk toner to turn out a toner image. A paper cassette 11 is loaded with a stack of papers. A pickup roller 12 pays out one paper from the cassette 11 at a time toward a registration roller pair 13. The registration roller pair 13 drives the paper toward the surface of the transfer drum 2 at a preselected timing. The paper is wrapped around the transfer drum 2 and moved in accordance with the rotation of the drum 2. When the paper is brought to a position adjoining the surface of the drum 1, a transfer charger 7 transfers the toner image from the drum 1 to the paper.

In a monochromatic copy mode, the paper or copy carrying a toner image thereon and separated from the transfer drum 2 has the toner image fixed thereon and then driven out to the tray 10. In a full-color made, toner images of four different colors Bk, M, C and Y are sequentially transferred to a paper one upon the other. Specifically, a Bk toner image is formed on the drum 1 and then transferred to a paper wrapped around the transfer drum 2. Subsequently, an M toner image is formed on the drum 1 and then transferred to the same paper upon the Bk toner image. This is repeated with the colors C and Y. As a result, a single full-color image is completed on the paper.

A separation charger 8 separates the paper carrying the color image thereon from the transfer drum 2. A fixing unit 9 fixes the color image on the paper. The resulting full-color copy is driven out to the tray 10.

Of course, the transfer drum 2 may be replaced with a conventional intermediate transfer belt or similar intermediate transfer body, in which case Bk, M, C and Y toner images will be sequentially transferred from the drum 1 to the intermediate transfer body and then collectively transferred to a paper.

(II) Image Processing of Color Copier

Figure 2:
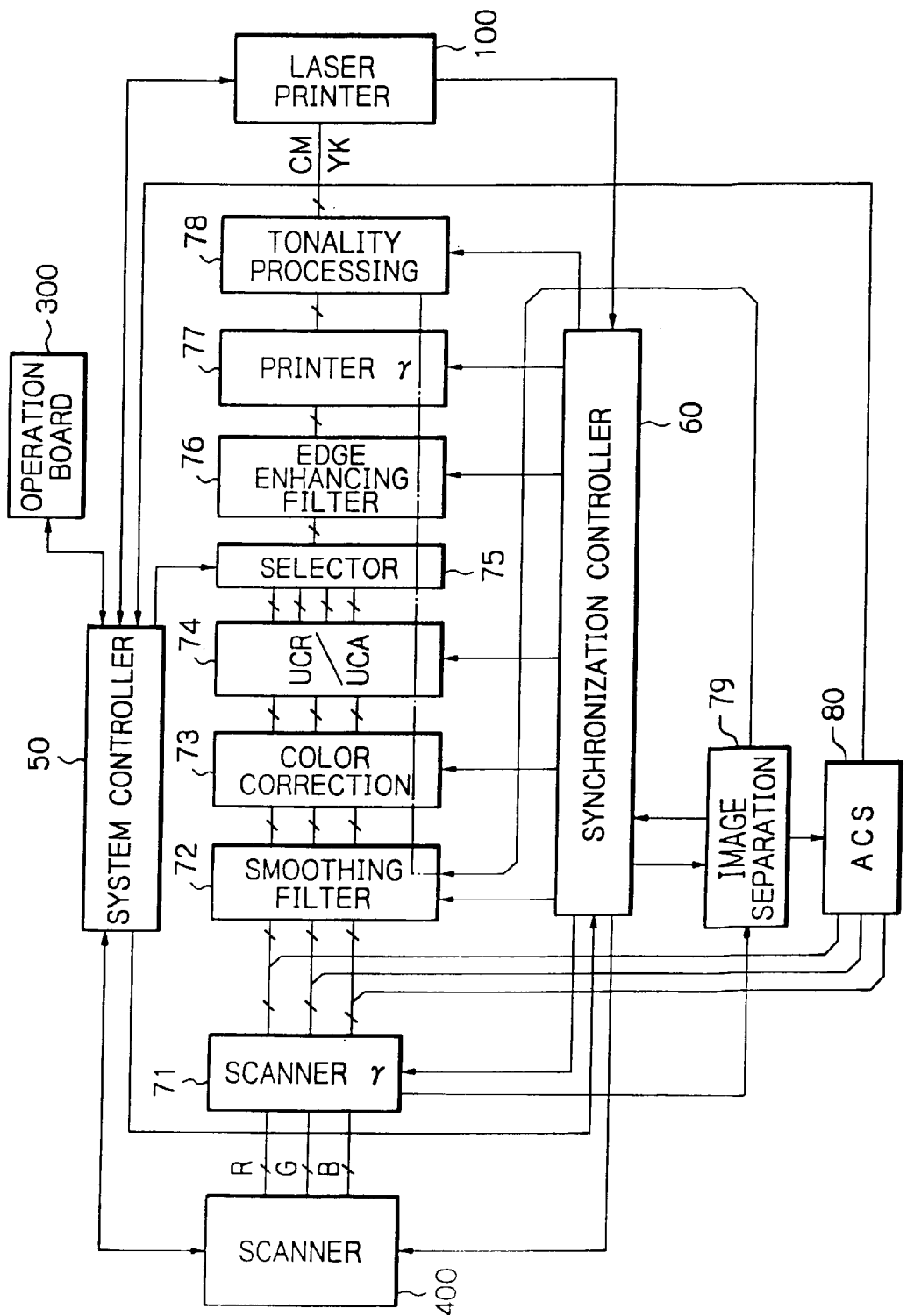
FIG. 2 is a block diagram schematically showing an image processing section included in the color copier.

FIG. 2 shows a specific configuration of an image processing section included in the copier of FIG. 1. As shown, a system controller 50 controls the operation of the entire copier and is implemented by a microcomputer. Operation board 300 is connected to system controller 50.

A synchronization controller 60 generates a clock pulse defining a reference control timing and inputs and outputs various synchronizing signals for synchronizing control units. In the illustrative embodiment, a main scan synchronizing signal on which a scanning timing is based is synchronous to the time when the laser beam starts scanning the drum 1 via the polygonal mirror 3b.

The R, G and B color signals output from the image scanner 400 are digitized to produce corresponding color image data having eight bits each. The image data are subjected to various kinds of processing in an image processing unit and then sent to the laser printer 100. The image processing unit includes scanner gamma correction 71, an RGB smoothing filter 72, a color correction 73, an undercolor removal (UCR)/undercolor addition (UCA) 74, a selector 75, an edge enhancing filter 76, a printer gamma 77 which is a density curve, a tonality processing 78, an image area separation 79, and an ACS (Achromatic/Chromatic Sensing) 80.

The scanner gamma correction 71 transforms the reflectance-linear RGB data to density-linear RGB data. The RGB smoothing filter 72 executes smoothing in order to reduce moiré ascribable to a dot document. The color correction 73 transforms the R, G and B color data to Y, M and C color data, respectively, which are complementary to R, G and B. The UCR/UCA 74 combines all of the Y, M and C image data, separates black components from the resulting image signals, and outputs them as a Bk signal. In addition, the UCR/UCA 74 removes black components from the other color image signals and adds Y, M and C components.

The selector 75 selects one of Y, M, C and Bk color signals input thereto in accordance with a command output from the system controller 50, and delivers the color signal selected to the edge enhancing filter 76. The edge enhancing filter 76 enhances edge data representative of a character image or a pattern image. The printer gamma 77 sets a curve matching with the characteristic of the laser printer 100.

The tonality processing 78 converts the input eight-bit density data to a bilevel or multilevel signal; in many cases, the processing 78 executes, e.g., dither processing. The bilevel or multilevel image signal is input to the laser printer 100. Halftone processing unique to the present invention is executed by the tonality processing 78, as will be described specifically later. The tonality processing 78 outputs multilevel data.

The outputs of the scanner gamma 71 are fed to the image area separation 79 and ACS 80 also. The image area separation 79 includes a circuit for distinguishing a text image and a graphic image and a circuit for determining whether the input color is chromatic or achromatic. The image area separation 79 delivers the result of each decision to a preselected processing block on a pixel basis. The processing blocks each switch the respective processing in accordance with the result output form the separation 79.

The ACS 80 determines whether the document set on the scanner 200 is a black-and-white document or a color document, and sends the result of decision to the system controller 50 at the end of Bk scanning. If the document is a color document, the ACS 80 causes scanning to repeat three more times after the Bk scanning. If the document is a black-and-white document, the ACS 80 causes the operation to end after the Bk scanning.

It is to be noted that a CPU (Central Processing Unit) included in the system controller 50 sets all parameters assigned to the processing blocks 71–80 of the image processing section.

(III) LD Multilevel Modulation

Figure 3A:
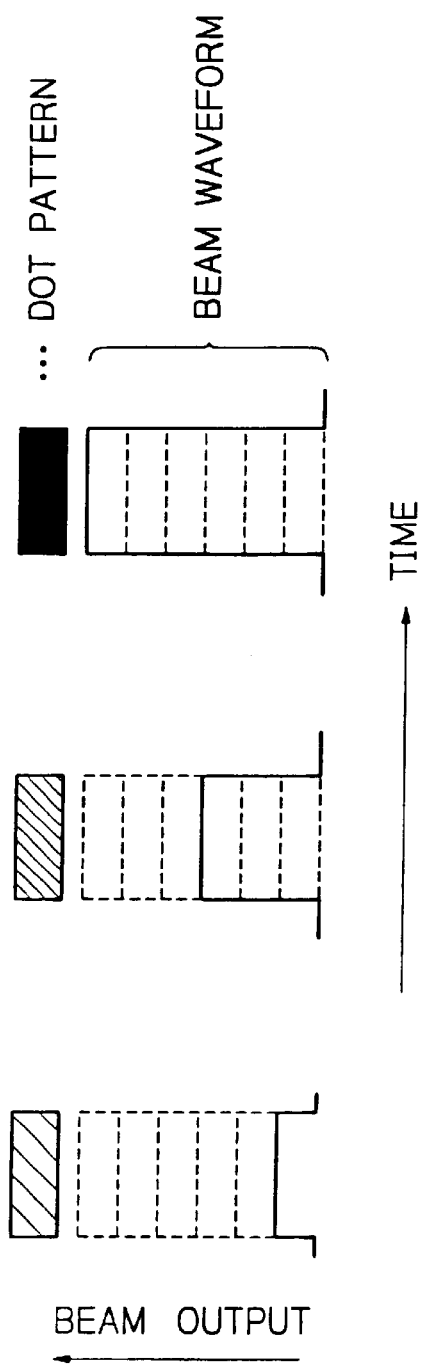
FIGS. 3A and 3B are charts demonstrating specific multilevel modulation systems applicable to a semiconductor laser.
Figure 3B:
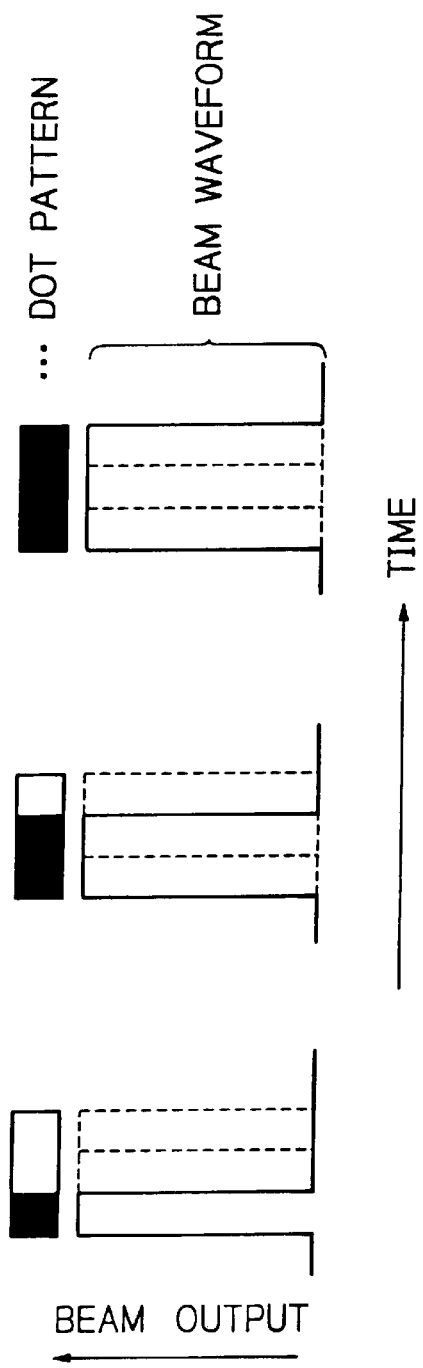

A multilevel modulation system for the semiconductor laser (LD hereinafter) or optical writing means will be described hereinafter. A one dot, multilevel output type LD modulation system may be implemented by the PWM system or the PM system. FIGS. 3A and 3B demonstrate the PM system and PWM system, respectively.

The PM system implements halftone recording by using a medium exposure range, so that stability is severely required of a printing process. However, the PM system promotes easy modulation. Specifically, as shown in FIG. 3A, the PM system outputs various dot patterns by varying the output level of the beam itself. Although the PM system simplifies and miniaturizes an LD modulating section, it is not practicable without resorting to an extremely stable printing process, as mentioned above, As shown in FIG. 3B, the PWM system uses only two beam output levels, but records dots by varying the duration of a beam, i.e., a pulse width. The PWM system basically using two levels uses a medium exposure range less frequently than the PM system and is capable of further reducing the medium exposure range by connecting nearby dots. This is successful to ease the requirements on the printing process. However, the problem with the PWM system is that to implement eight bits for a single dot, a time width of several nanoseconds assigned to a single dot must be subdivided into 256 segments. This cannot be done without high speed, high accuracy semiconductor control, i.e., a sophisticated LD control section. To obviate the demerit of the PM system and that of the PWM system, the present invention uses a combined PWM and PM system, as follows.

Figures 4A, 4B:
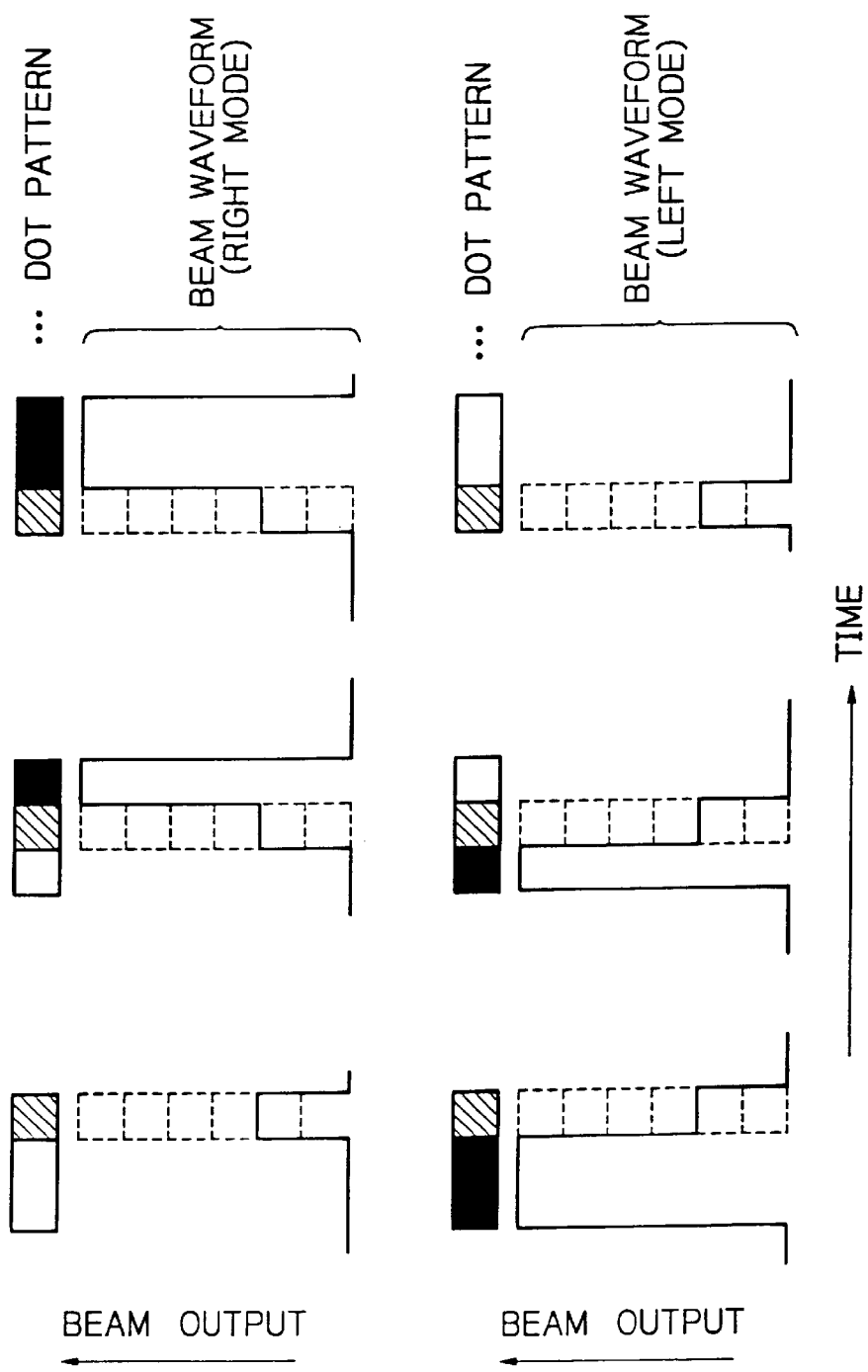
FIGS. 4A and 4B are charts representative of multilevel modulation systems implemented by the combination of PWM and PM (Power Modulation)

FIGS. 4A and 4B demonstrate specific procedures representative of the combined PWM and PM system. As shown, a transition point between pulse widths is interpolated by PM. For example, with eight PWM levels and thirty-two PM levels, it is possible to realize consecutive degrees of modulation corresponding to eight bits ($2"=256$ tones). Because the combined PWM and PM system reduces the number of PWM steps, it is capable of digitally and therefore easily setting pulse widths and easily controlling a pulse position. FIGS. 4A and 4B respectively show a right mode for starting generating a pulse at the right edge of a single dot and a left mode for starting generating it at the left edge of the same. In this manner, the system so controls a phase as to cause the trailing edge or the leading edge of a pulse to appear first, thereby controlling a dot position. Further, a center mode shown in FIG. 5C is available for starting generating a pulse at the center of a single dot toward opposite sides.

A specific LD driving method relating to the combined PWM and PM multilevel writing system will be described hereinafter. As for time, the emission pattern of the laser for a single pixel is divided into $2"$ steps on the basis of the resolution of a pixel clock width of $½"$. As for power, the emission pattern is divided into $2^{(n-m)}$ steps on the basis of a power resolution of $½^{(n-m)}$. The $2"$ steps and $2^{(n-m)}$ steps are combined to render $2^n$ different tones. Consequently, the required division accuracy is reduced for both of the emission time and emission power, so that multiple levels can be easily realized.

As regards the eight-bit digital image signal of the present invention, assuming that m is 3, then 8 ($=2^m=2^3$) PWM steps and 32 ($=2^{(n-m)}=2^5$) PM steps are available. By combining such PWM steps and PM steps, it is possible to form 256 different emission patterns, i.e., 256-tone LD multilevel modulation. Further, by causing a timing generating circuit and power setting circuit assigned to the LD to vary a signal to be output, it is possible to implement any desired emission pattern.

Circuitry and apparatus for the above multilevel LD drive may have a configuration taught in any one of, e.g., Japanese Patent Laid-Open Publication Nos. 2-243363, 3-1656 and 6-347852.

FIGS. 5A–5C demonstrate phase control (position control) for the PWM system. As shown, the phase of a pulse width is controlled in accordance with a mode set by a control logic (right mode, left mode or center mode), thereby controlling the dot position to the right, center or left.

FIGS. 6A–6C show a fraction processing function also available with the present invention. When two pixels contiguous in the main scanning direction are added together and then output, a period of time for effecting PM modulation usually occurs at two positions, as indicated by hatching in FIG. 6B. The fraction processing function combines the two periods of time into one. Basically, data of a smaller fraction is added to data of a greater fraction. So long as the greater fraction does not become maximum, all the data of the smaller fraction portion are added to the greater fraction. After the greater fraction has become maximum, a residual, if any, is allotted to the smaller fraction and subjected to PM. With this function, it is possible to sufficiently reduce the pulse width setting step with respect to a beam diameter. Specifically, FIGS. 6A–6C demonstrate the above procedure in the form of a dot image and a beam waveform. FIGS, 6A–6C respectively show a dot image before correction, a dot image around the time of correction, and a dot image after correction. As shown, two portions Δt of data included in two contiguous pixels and where the beam intensity is not maximum are compared, and the smaller portion is added to the greater portion; a residual, if any, is allotted to the smaller portion.

(IV) Circuitry for Addition Control and Phase Control

Figure 7:
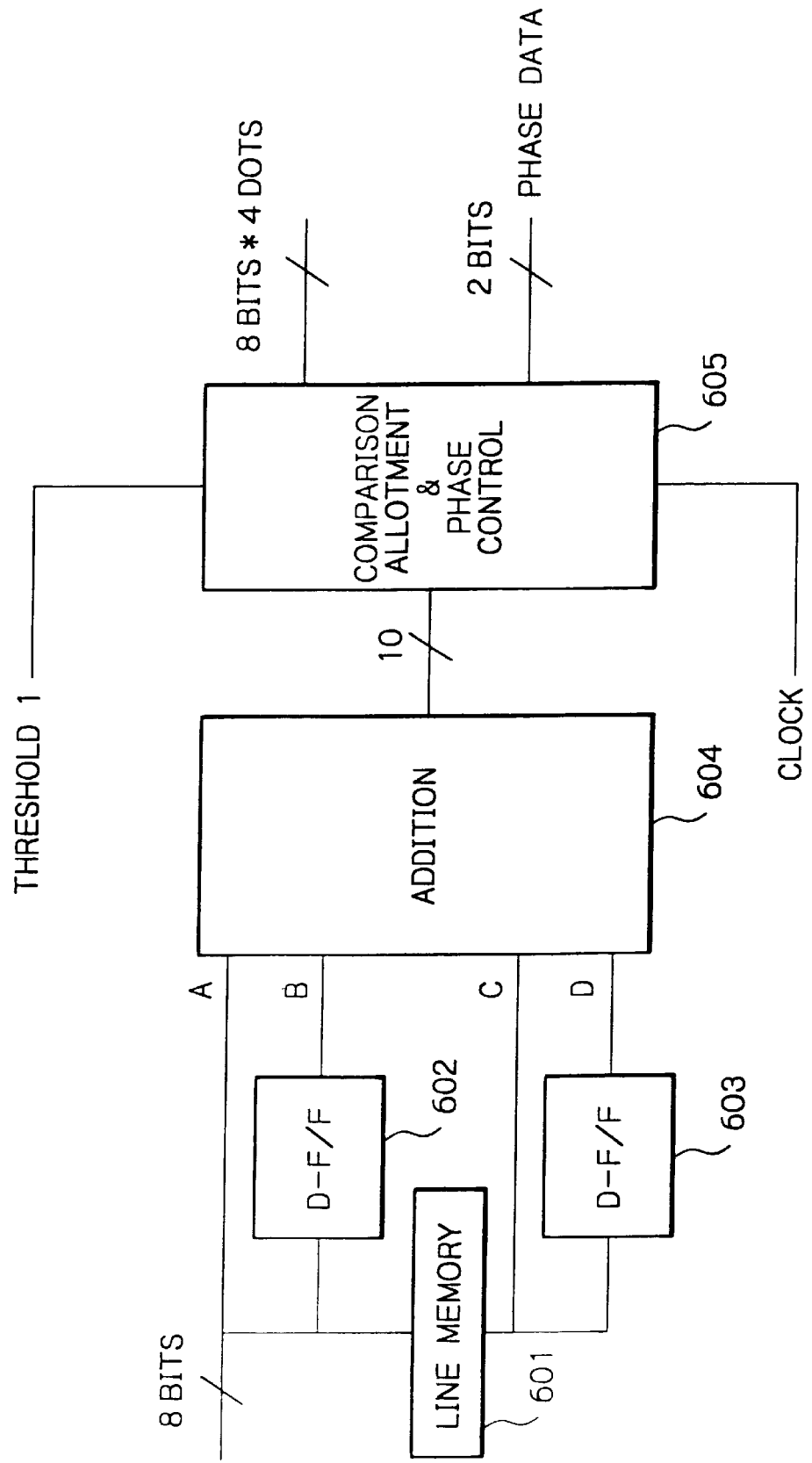
FIG. 7 is a schematic block diagram showing circuitry for adding the data of nearby pixels, determining and allotting the resulting sum data, and controlling a dot phase.

FIG. 7 shows specific control circuitry for adding the data of nearby pixels, determining and allotting the resulting sum data, and controlling a dot phase. The following description will concentrate on a procedure 6, which will be described later, which adds two dots in the main scanning direction and two dots in the subscanning directions at maximum. As shown, the Y, M, C and Bk image data each are input to the circuitry with eight bits and 256 tones. A D-F/F (Data type Flip-Flop) or latch circuit 802 allows eight-bit data A and B representative of two dots contiguous in the main scanning direction to be input to an addition 604. A memory 601 delays data of the immediately preceding line. A D-F/F or latch circuit 603 therefore causes eight bit data C and D representative of two contiguous dots of the previous line coincident in address with the above two dots to be input to the addition 604. The addition 604 adds the four dots of data and inputs the resulting sum data to a comparison/allotment/phase control 605. The control 605 compares the sum data with a threshold "1" relating to saturation and selects either one of the above four-dot addition in the main and subscanning directions and two-dot addition in the main scanning direction only. The control 605 allots the sum in accordance with an algorithm to be described later such that the data concentrate. Further, the control 605 switches a write phase signal to a toggle. The hardware shown in FIG. 7 for executing the above control may be replaced with software which will be described specifically later.

Figure 8A:
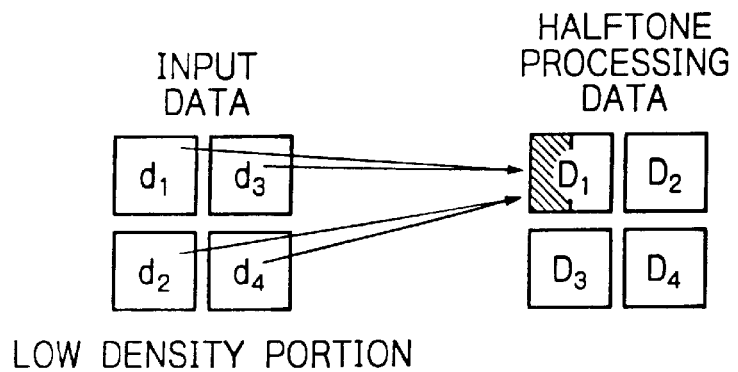
FIGS. 8A and 8B are views respectively demonstrating the operation of the circuitry of FIG. 7 executed with a low density portion (four-dot addition) and a medium or a high density portion (two-dot addition)
Figure 8B:
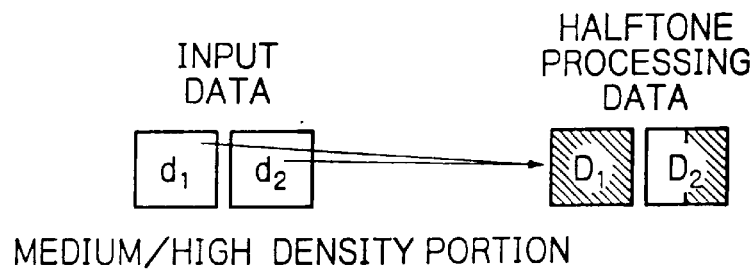

FIGS. 8A and 8B demonstrate a specific four-dot addition procedure and a specific two-dot addition procedure, respectively. As shown in FIG. 8A, as for a low density portion, four dots $d_1$–$d_4$ contiguous in the main and subscanning directions are added, and the resulting sum is dealt with as data $D_1$. As shown in FIG. 8B, as for a medium or a high density portion, two dots $d_1$ and $d_2$ contiguous in the main scanning direction are added, and the resulting sum is dealt with as data $D_1$ having a saturation value and data $D_2$ which is a residual.

The present invention contemplates to stably start reproducing a highlight portion from a lower density and to give priority to resolution and stability for a medium and a high density portion. The present invention will be described more specifically hereinafter.

A first embodiment of the present invention has the following objects (1)–(3):

(1) To form a high quality image with a minimum of banding and a minimum of image noise by adding a plurality of dots of image data and generating density at a particular pixel in order to stabilize the density of a highlight portion;

(2) To stabilize an image by forming solitary dots in the main scanning direction particularly in a highlight portion; and (3) To stabilize an image by connecting dots contiguous in the main scanning direction particularly in a highlight portion for thereby forming a solitary dot.

A second embodiment of the present invention has the following objects (1)–(4):

(1) To form a high quality image with a minimum of banding and a minimum of image noise by adding a plurality of dots of image data, generating density at a particular pixel, and connecting dots in the subscanning direction particularly in a highlight portion;

(2) To insure saturation and stabilization by generating, after the minimum dot density data of a particular pixel has saturated, the density of the next particular pixel;

(3) To reduce the number of required line buffers (line memories) and therefore the cost; and (4) To render the result of density generation based on a particular pixel faithful on the basis of the center of gravity of the density of original data.

A third embodiment of the present invention has the following objects (1)–(6):

(1) To form a high quality image with a minimum of banding and a minimum of image noise by adding a plurality of dots of image data and generating density at a particular pixel in order to stabilize the density of a highlight portion, and to reproduce an adequate image from low density to high density by causing a number of pixel data to concentrate particularly in a low density portion for stable tonality reproduction while causing a small number of pixel data to concentrate in a medium and a high density portion to give priority to resolution;

(2) To form a high quality image with a minimum of banding and a minimum of image noise by adding a plurality of dots of image data and generating density at a particular pixel in order to stabilize the density of a highlight portion, and to reproduce dots in a highlight portion, among others, from a lower density;

(3) To stabilize an image by spacing pixels where density is generated in a highlight portion, among others, by one or more dots in the main scanning direction;

(4) To stabilize an image by spacing pixels where density is generated in a highlight portion, among others, by one or more dots in the subscanning direction;

(5) To stabilize an image by forming solitary dots in the main and subscanning directions particularly in a highlight portion; and (6) To stabilize an image by implementing, particularly in a low density portion, a zigzag dot distribution in which reproduced dots do not join each other.

A fourth embodiment of the present invention has the following objects (1)–(4):

(1) To form a high quality image with a minimum of banding and a minimum of image noise by adding a plurality of dots of image data and generating density at a particular pixel in order to stabilize the density of a highlight portion, and to render, in a high density portion, the local omission of a character (split character) inconspicuous by scattering reproduced dots;

(2) To insure tonality particularly in a high density portion by repeating the arrangement of reproduced dots over two or more lines in the subscanning direction;

(3) To maintain the configuration of line dots particularly in a high density portion by causing a dot to evenly grow to the right and left with respect to existing line dots; and (4) To render the local omission of a character (split character) inconspicuous by generating, before a particular pixel for generating density reaches saturation density, density in another pixel and thereby scattering reproduced dots in a medium and a high density portion.

(V) Dot Formation by Addition, Allotment and Phase Control

To implement the above (I)–(IV), the present invention adds two dots contiguous in the main or the subscanning direction or four dots contiguous in the main and subscanning directions, and starts reproducing a dot at a preselected pixel on the basis of the result of addition. At this instant, the present invention connects nearby particular pixels by using the right and left phases available with each particular pixel. Seven specific procedures 1–7 will be described hereinafter.

[A] Addition of Two Dots in Subscanning Direction (½ Pulse Division): Procedures 1, 2 and 3

Figure 9A:
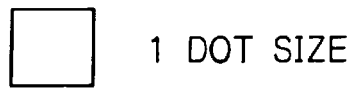
FIGS. 9A and 9B are views respectively showing a single dot size and a single pixel size (minimum density unit) applicable to procedures 1–4 of the present invention.
Figure 9B:
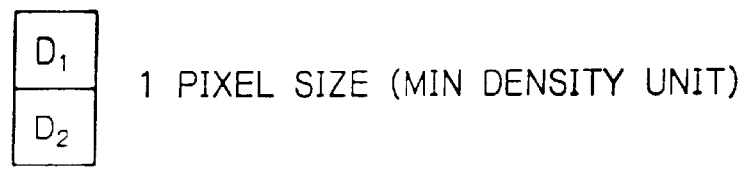
Figure 10:
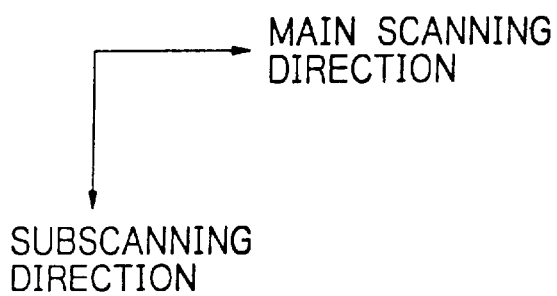
FIG. 10 is a view showing a dot formation matrix applicable to the procedure 1.

FIGS. 9A and 9B respectively show a single dot size and a single pixel size (minimum density unit) for effecting procedures 1–3. FIG. 10 shows a matrix for forming dots also applicable to the procedures 1–3. A pulse begins to be generated at a portion of the matrix to which the smallest number is assigned. At this instant, a single dot is divided into two half pulses by PWM. When one dot reaches a full condition (50% duty), the operation advances to the second smallest number and generates the next pulse. The PWM right and left phases are switched by even/odd (E/O hereinafter) in the main scanning direction, so that pulses are connected in the direction in which nearby numbers are identical. The algorithm for the generation of density is expressed as:

when $0 \leq d_1+d_2 \leq 127$ $D_1=d_1+d_2$, $D_2=0$ when $128 \leq d_1+d_2 \leq 245$ $D_1=127$, $D_2=d_1+d_2-127$ when $255 \leq d_1+d_2 \leq 382$ $D_1=d_1+d_2-127$, $D_2=127$ when $383 \leq d_1+d_2 \leq 510$ $D_1=255$, $D_2=d_1+d_2-255$ where $d_1$ and $d_2$ denote the non-processed input image data (eight-bit data) of nearby dots, and $D_1$ and $D_2$ denote the processed image data of the same (eight-bit data). The processed eight-bit data $D_1$ and $D_2$ are used as a write signal for driving the LD. The procedures 1–3 for implementing the dot formation algorithm will be described in detail hereinafter.

(Procedure 1)

1) The densities of two nearby dots in the subscanning direction are added;

2) A pulse begins to be generated at a portion "1" of the dot matrix;

3) The PWM right and left phases are switched in accordance with E/O in the subscanning direction so as to connect write pulses in the direction in which nearby numerical values are identical; and 4) One dot is divided into two half pulses, and PM for the next number is generated when one dot reaches the full condition (50% duty).

Figure 11:
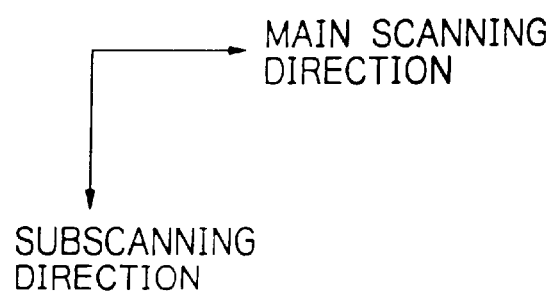
FIG. 11 is a view showing a minimum density unit included in the matrix of the procedure 1.

FIG. 11 shows the minimum density unit included in the matrix of FIG. 10 particular to the procedure 1. As shown, a pulse is generated in the right phase in D1 and in the left phase in D1'. As a result, pulses appearing in the portion "1" of the matrix are connected to each other (see FIG. 12A). This is repeated to sequentially generate pulses in a portion "2" and successive portions of the matrix in accordance with density.

Figure 12A:
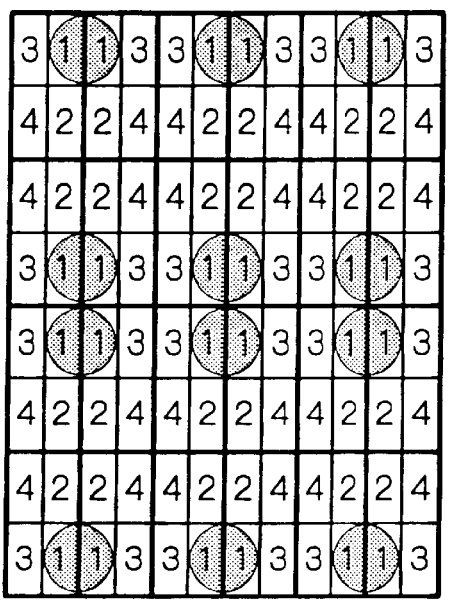
FIGS. 12A–12D are views showing how the procedure 1 forms dots.
Figure 12B:
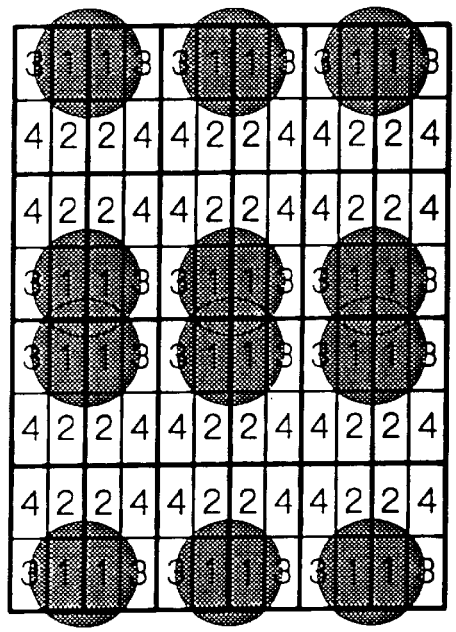
Figure 12C:
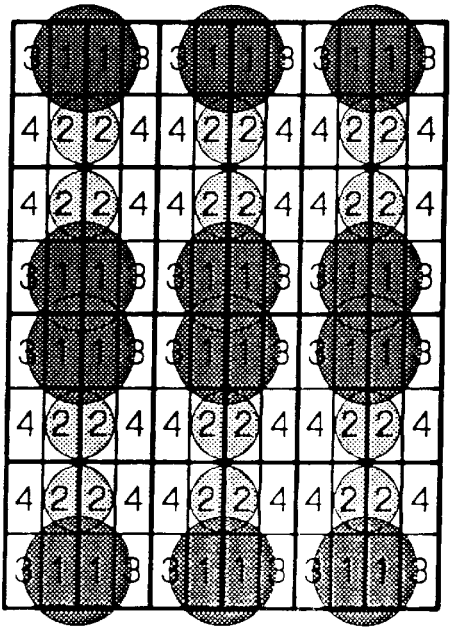
Figure 12D:
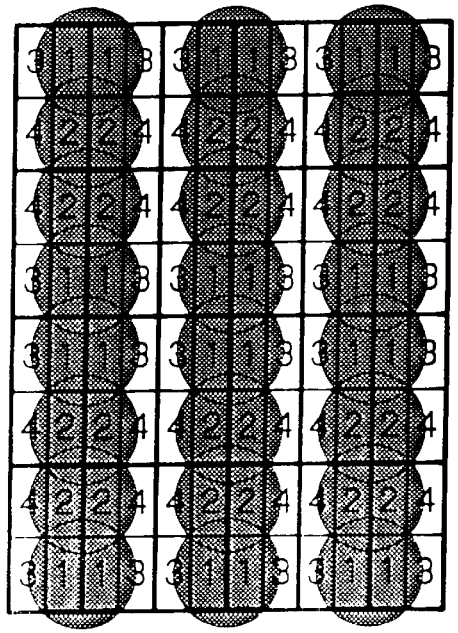

The procedure 1 will be described more specifically with reference to FIGS. 12A–12D and 13A–13C. As shown in FIG. 12A, when the density is up to ⅛ (one solitary dot), pulses connected to each other are generated in the nearby portions "1" of the matrix while being shifted to the right in the odd pixel in the main scanning direction and shifted to the left in the even pixel. As shown in FIG. 12B, when the density is between ⅛ and ¼ (one solitary dot), the pulse width is increased to such a degree that the connected pulses of the portions "1" reach the full condition (50% duty). As shown in FIG. 12C, when the density is between ¼ and ⅜ (300 line dots), connected pulses are generated in nearby portions "2" in the same phase as in the portions "1". As shown in FIG. 12D, when the density is between ⅜ and ½ (300 line dots), the pulse width is increased to such a degree that the connected pulses in the portions "2" reach the full condition (50% duty).

Figure 13A:
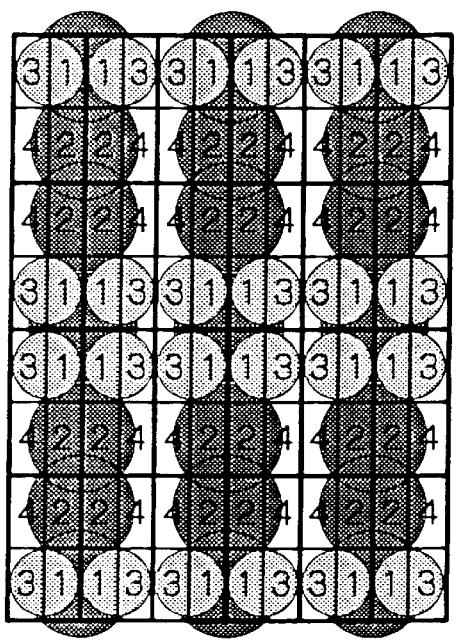
FIGS. 13A–13C are views also showing how the procedure 1 forms dots.
Figure 13B:
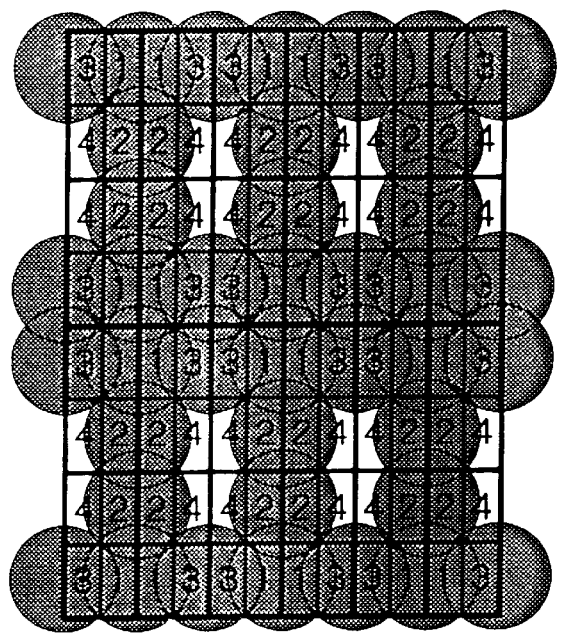
Figure 13C:
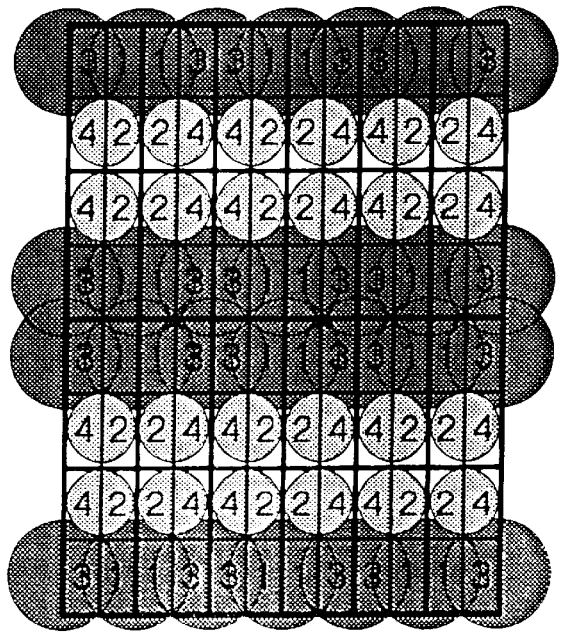

As shown in FIG. 13A, when the density is between ½ and ⅝, connected pulses are generated in portions "3" of the matrix so as to increase the pulse width of the portions "1". As shown in FIG. 13B, when the density is between ⅝ and ¾, the pulse width is increased to such a degree that the connected pulses in the portions "3" reach the full condition (50% duty). As shown in FIG. 13C, when the density is between ¾ and ⅞, connected pulses are generated in portions "4" so as to increase the pulse width of the portions "2". Further, when the density is between ⅞ and ¹⁄₁, the pulse width is increased to such a degree that the connected pulses in the portions "4" reach the full condition (50% duty).

With the above procedure 1, it is possible to regularly reproduce an image in a highlight portion with solitary dots, to implement 300 line dots (600 dpi) in a medium density range, to implement linear tonality in the solitary dot, vertical line dots growth system, and to enhance potential concentration and increase the saturated region for guaranteeing stability and resistance to banding.

(Procedure 2)

1) The densities of two nearby dots in the subscanning direction are added;

2) A pulses begins to be generated at the portion "1" of the dot matrix;

3) The PWM right and left phases are switched in accordance with E/O in the subscanning direction so as to connect write pulses in the direction in which nearby numerical values are identical; and 4) One dot is divided into half pulses, and PWM for the next number is generated when one dot reaches the full condition (50% duty).

Figure 14:
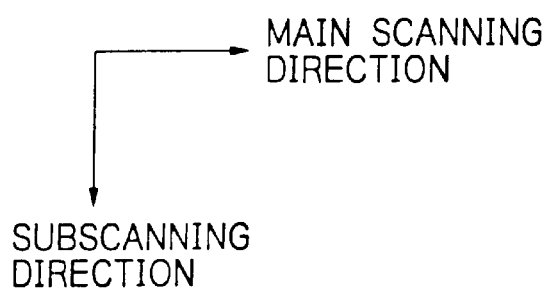
FIG. 14 is a view showing a dot formation matrix applicable to the procedure 2.
Figure 15:
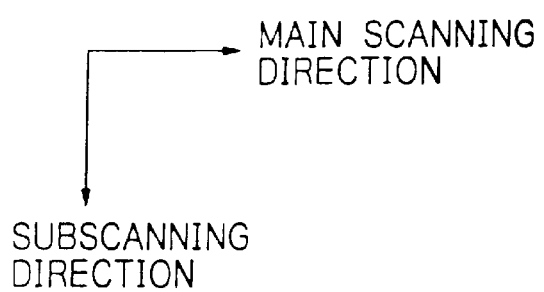
FIG. 15 is a view showing a minimum density unit included in the matrix of procedure 2.

FIG. 14 shows a dot formation matrix particular to the procedure 2. As shown, the procedure 2 differs from the procedure 1 in that it uniforms the phase in the subscanning direction in order to increase spatial frequency in a highlight or a high density portion. FIG. 15 shows the minimum density unit included in the matrix of FIG. 14. As shown, a pulse is generated in the right phase in D1 and in the left phase in D1'. As a result, pulses appearing in the portions "1" in FIG. 14 are connected to each other (see FIG. 16A). This is repeated to sequentially generate pulses in the portions "2" and successive portions of FIG. 14 in accordance with density.

Figure 16A:
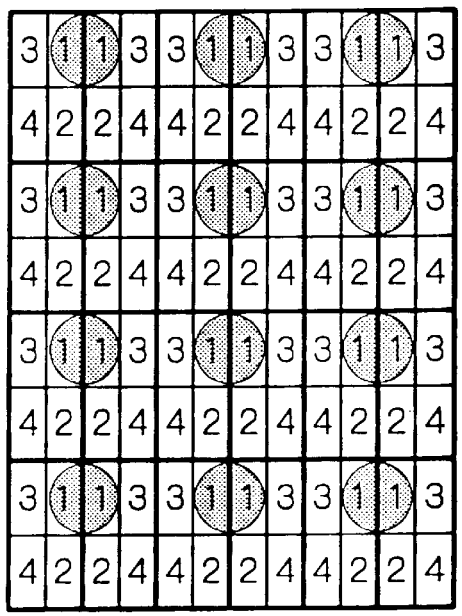
FIGS. 16A–16D are views showing how the procedure 2 forms dots.
Figure 16B:
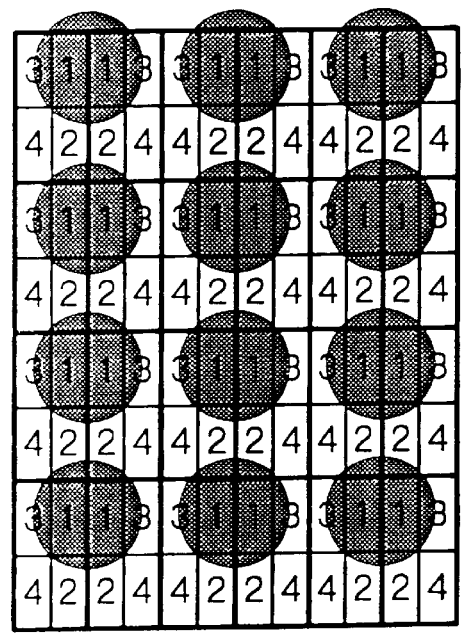
Figure 16C:
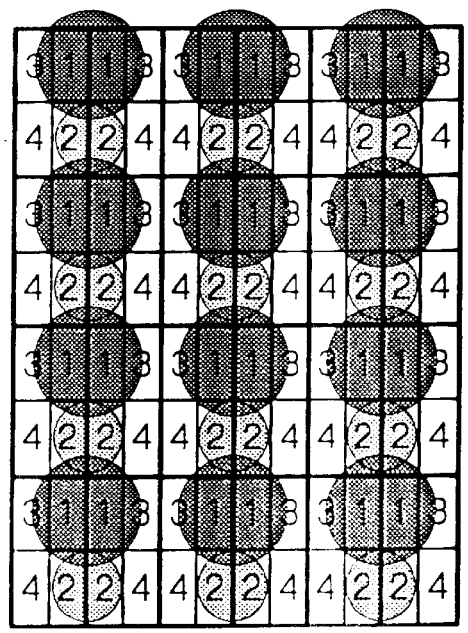
Figure 16D:
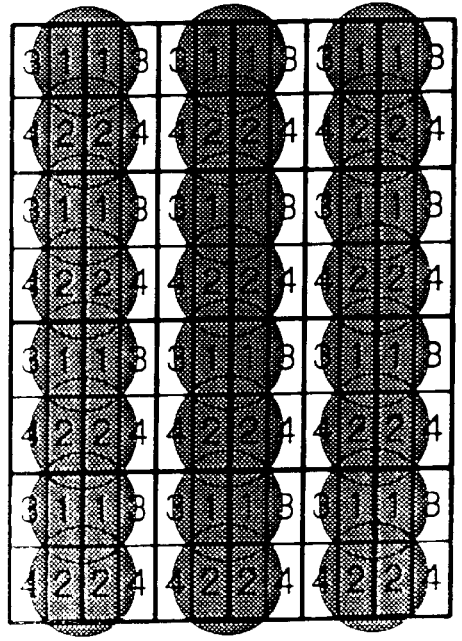

The procedure 2 will be described more specifically with reference to FIGS. 12A–16D and 17A–17C. AS shown in FIG. 16A, when the density is up to ⅛ (one solitary dot), connected pulses are generated in the nearby portions "1" of the matrix while being shifted to the right in the odd pixel in the main scanning direction and shifted to the left in the even pixel. As shown in FIG. 16B, when the density is between ⅛ and ¼ (one solitary dot), the pulse width is increased to such a degree that the connected pulses of the portions "1" reach the full condition (50% duty). As shown in FIG. 16C, when the density is between ¼ and ⅜ (300 line dots), connected pulses are generated in the portions "2" in the same phases as in the portions "1". As shown in FIG. 16D, when the density is between ⅜ and ½ (300 line dots), the pulse width is increased to such a degree that the connected pulses in the portions "2" reach the full condition (50% duty).

Figure 17A:
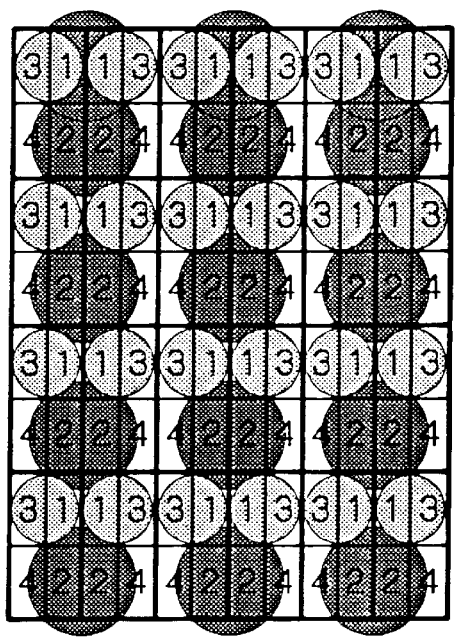
Figure 17B:
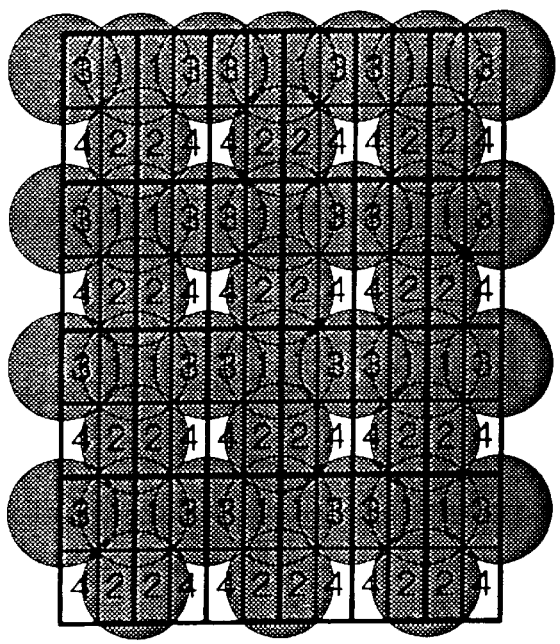
Figure 17C:
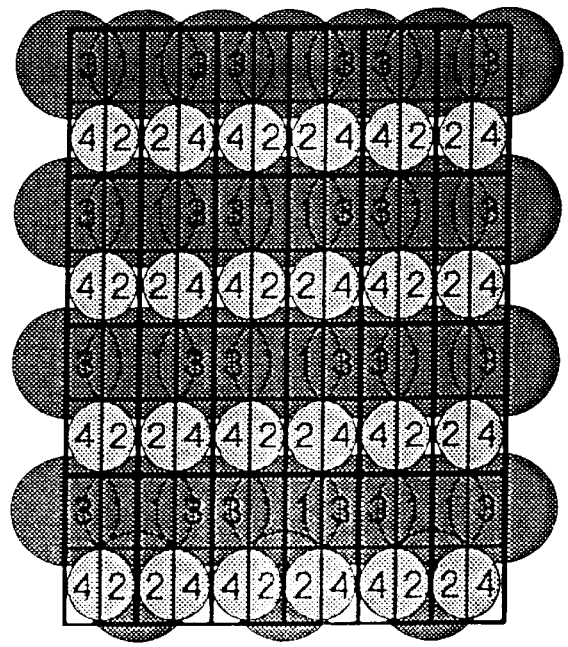

As shown in FIG. 17A, when the density is between ½ and ⅝, connected pulses are generated in the portions "3" of the matrix so as to increase the pulse width of the portions "1". As shown in FIG. 17B, when the density is between ⅝ and ¾, the pulse width is increased to such a degree that the connected pulses in the portions "3" reach the full condition (50% duty). As shown in FIG. 17C, when the density is between ¾ and ⅞, connected pulses are generated in the portions "4" so as to increase the pulse width of the portions "2". Further, when the density is between ⅞ and ¹⁄₁, the pulse width is increased to such a degree that the connected pulses in the portions "4" reach the full condition (50% duty).

With the above procedure 2, it is possible to render a highlight portion inconspicuous by scattering it to solitary dots and to render a split character inconspicuous by reducing the dot size of local omission in a high density portion (Procedure 3)

1) The densities of two nearby dots in the subscanning direction are added;

2) A pulse begins to be generated at the portion "1" of the dot matrix;

3) The PWM right and left phases are switched in accordance with E/O in the main scanning direction so as to connect write pulses in the direction in which nearby numerical values are identical; and 4) One dot is divided into half pulses, and PWM for the next number is generated when one dot reaches the full condition (50% duty).

Figure 18:
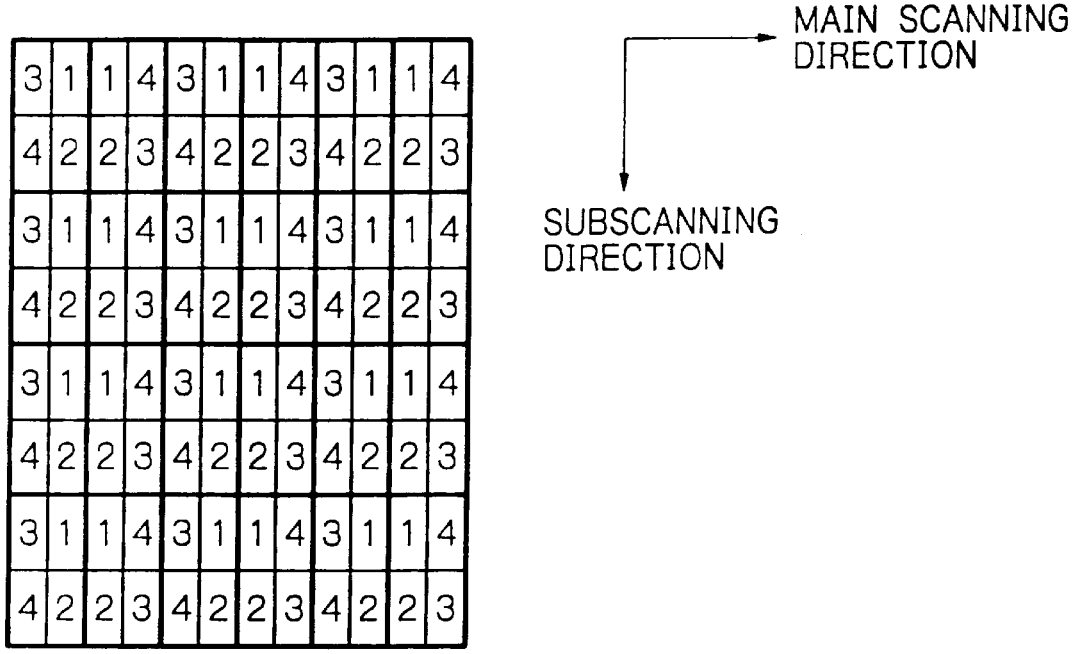
FIG. 18 is a view showing a dot formation matrix applicable to the procedure 3.
Figure 19:
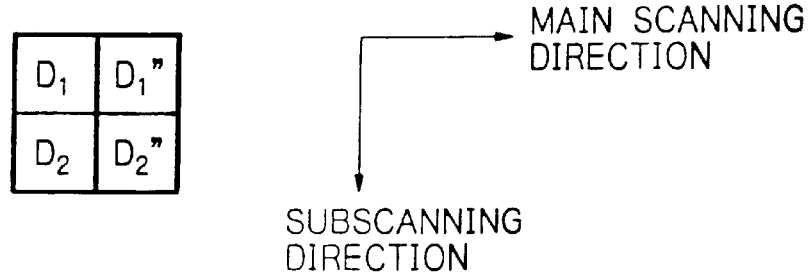
FIG. 19 is a view showing a minimum density unit included in the matrix of the procedure 3.

The procedure 3 is similar to the procedure 2 except that it scatters the dots of a dot formation matrix reproducing a high density in order to increase the spatial frequency of a high density portion, i.e., to render a split character inconspicuous. FIG. 18 shows a dot formation matrix particular to the procedure 3. FIG. 19 shows a minimum density unit included in the matrix of FIG. 18. As shown, a pulse is generated in the right phase in D1 and in the left phase in D1". As a result, pulses appearing in the portions "1" in FIG. 18 are connected to each other. This is repeated to sequentially generate pulses in the portions "2" and successive portions of FIG. 18 in accordance with density.

Figure 20A:
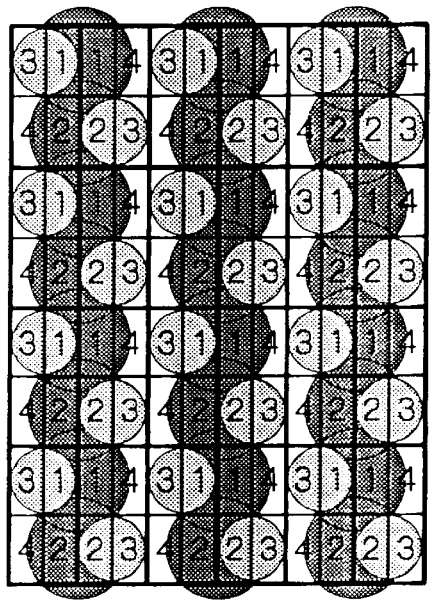
FIGS. 20A and 20B are views showing how the procedure 3 forms dots.
Figure 20B:
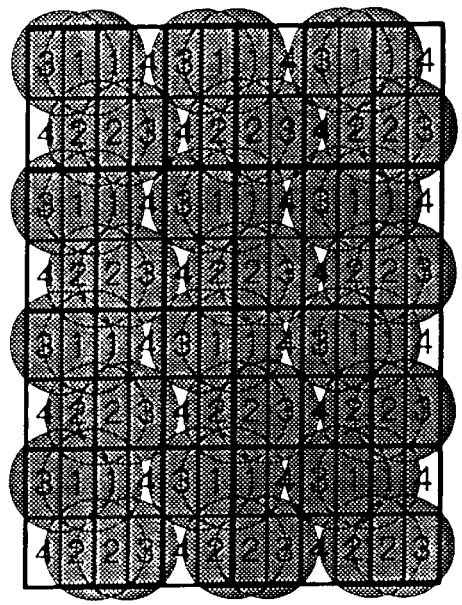

The procedure 3 will be described more specifically with reference to FIGS. 20A and 20B. As for the density range of up to ⅛ (one solitary dot) and the density range of up to ½ (300 line dots), the procedure 3 also forms the dot patterns shown in FIGS. 16A–16D. As shown in FIG. 20A, when the density is between ½ and ⅝, connected pulses are generated in the portions "3" of the matrix so as to increase the pulse width of the portions "1" and "2". As shown in FIG. 20I, when the density is between ⅝ and ¾, the pulse width is increased to such a degree that the connected pulses in the portions "3" reach the full condition (50% duty). When the density is between ¾ and ⅞, connected pulses are generated in the portions "4" so as to increase the pulse width of the portions "1" and "2". Further, when the density is between ⅞ and ¹⁄₁, the pulse width is increased to such a degree that the connected pulses in the portions "4" reach the full condition (50% duty).

The procedure 3 renders a split character more inconspicuous than the procedure 2 by scattering the local omission (white background) in a zigzag configuration.

[B] Addition of Two Dots in Subscanning Direction (¼ Pulse Division): Procedure 4

Figure 21:
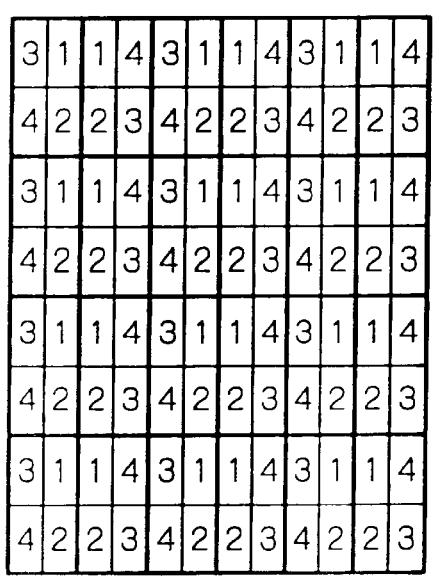
FIG. 21 is a view showing a dot formation matrix applicable to the procedure 4.

In a procedure 4, A pulse begins to be generated at a portion of a matrix shown in FIG. 21 to which the smallest number is assigned, as in the procedure 3. At this instant, one dot is selectively divided into half pulses or quarter pulses. When one dot reaches a 50% duty or a 25% duty, the operation advances to the second smallest number and generates the next pulse. The PWM right and left phases are switched by E/O in the main scanning direction, so that pulses are connected in the direction in which nearby numbers are identical. The algorithm for the generation of density is expressed as:

when $0 \leq d_1+d_2 \leq 127$ $D_1=d_1+d_2$, $D_2=0$ when $128 \leq d_1+d_2 \leq 190$ $D_1=127$, $D_2=d_1+d_2-127$ when $191 \leq d_1+d_2 \leq 254$ $D_1=d_1+d_2-63$, $D_2=63$ when $255 \leq d_1+d_2 \leq 318$ $D_1=191$, $D_2=d_1+d_2-191$ when $319 \leq d_1+d_2 \leq 382$ $D_1=d_1+d_2-127$, $D_2=127$ when $383 \leq d_1+d_2 \leq 510$ $D_1=255$, $D_2=d_1+d_2-255$ where $d_1$ and $d_2$ denote the non-processed input image data (eight-bit data) of nearby dots, and $D_1$ and $D_2$ denote the processed image data of the same (eight-bit data). The processed eight-bit data $D_1$ and $D_2$ are used as a write signal for driving the LD. The procedure 4 for implementing the dot formation algorithm will be described specifically hereinafter.

(Procedure 4)

1) The densities of two nearby dots in the subscanning direction are added;

2) A pulse begins to be, generated at the portion "1" of the dot matrix;

3) The PWM right and left phases are switched in accordance with E/O in the main direction so as to connect write pulses in the direction in which nearby numerical values are identical, and 4) One dot is divided into half pulses or quarter pulses, and PWM for the next number is generated when one dot reaches the 50% duty or the 25% duty.

Figure 22:
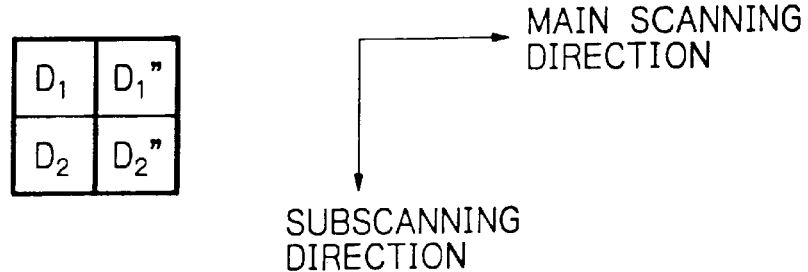
FIG. 22 is a view showing a minimum density unit included in the matrix of procedure 4.

FIG. 21 shows a dot formation matrix applicable to the procedure 4 and identical with the matrix of FIG. 18. In the procedure 4, when the 25% duty is reached in the portion "2", the writing operation advances to the portions "3" in order to render a split character in a medium density portion inconspicuous. FIG. 22 shows a minimum density unit included in the matrix of FIG. 21. As shown, a pulse is generated in the right phase in D1 and in the left phase in D1". As a result, pulses appearing in the portions "1" in FIG. 21 are connected to each other, as in the procedure 3. This is repeated to sequentially generate pulses in the portion "2" and successive portions of FIG. 21 in accordance with density.

Figure 23A:
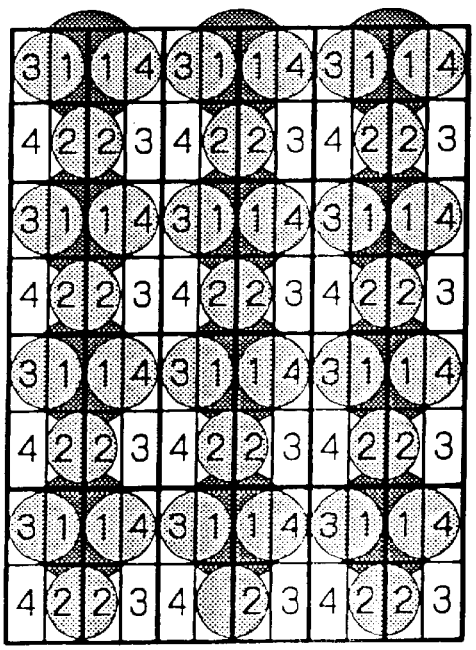
FIG. 23A and 23B is a view showing how the procedure 4 forms dots.
Figure 23B:
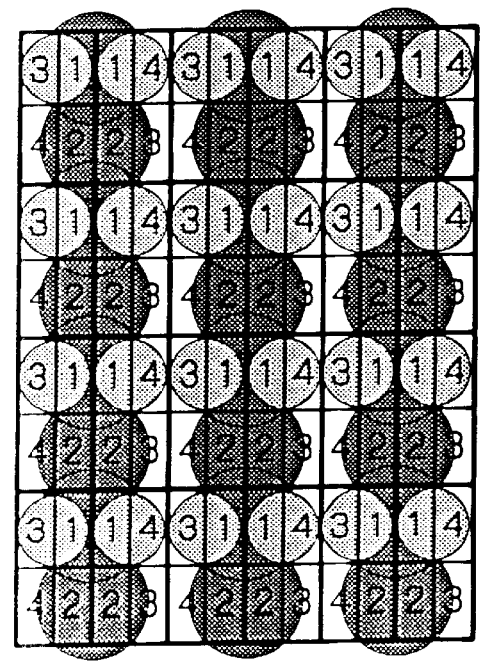

As for the density range of up to ⅛ (one solitary dot) and the density range of up to ⅜ (300 line dots), the procedure 4 forms dot patterns in the same manner as the procedure 3. As shown in FIG. 23A, when the density is between ⅜ and ½, the writing operation advances to the portions "3" when connected pulses in the portions "2" each reach the 25% duty, and then connects, when the connected pulses in the portions "3" each reach the 25% duty, such pulses to the pulses of the portions "1" thereby increasing the duty to 75%. If desired, for a highlight portion, the matrix may be rearranged in a zigzag configuration, i.e., "1" and "2" may be replaced with each other for replacing "3" and "4" alternately. This is also successful to render a split character as inconspicuous as in the procedure 3. As shown in FIG. 23B, when the density is between ½ and ⅝, connected pulses are generated to such a degree that the portions "2" of the matrix each reach the full condition (50% duty). As for the density of ¾ and successive densities, the procedure 4 is identical with the procedure 3.

The procedure 4 renders a split character in a medium density portion more inconspicuous than the procedure 3. In addition, the procedure 4, like the procedure 3, scatters the local omission (white background) in a high density portion and thereby makes a split character inconspicuous.

[C] Addition of Two Dots in Main Scanning Direction (½ Pulse Division) Procedure 5

Figure 24A:
FIGS. 24A and 24B are views respectively showing a single dot size and a single pixel size (minimum density unit) included in a procedure 5 of the present invention.
Figure 24B:
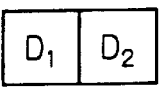
Figure 25:
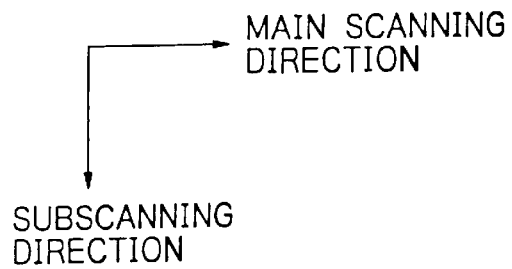
FIG. 25 is a view showing a dot formation matrix applicable to the procedure 5.

FIGS. 24A and 24B respectively show a single dot size and a single pixel size (minimum density unit) for effecting a procedure 5. FIG. 25 shows a matrix for forming dots also applicable to the procedure 5. A pulse begins to be generated at a portion of the matrix to which the smallest number is assigned. At this instant, one dot is divided into half pulses by PWM. When one dot becomes full (50% duty), the operation advances to the second smallest number and generates the next pulse. The PWM right and left phases are switched by E/O in the main scanning direction, so that pulses are connected in the direction in which nearby numbers are identical. The algorithm for the generation of density is expressed as:

when $0 \leq d_1+d_2 \leq 127$ $D_1=d_1+d_2$, $D_2=0$ when $128 \leq d_1+d_2 \leq 254$ $D_1=127$, $D_2=d_1+d_2-127$ when $255 \leq d_1+d_2 \leq 382$ $D_1=d_1+d_2-127$, $D_2=127$ when $383 \leq d_1+d_2 \leq 510$ $D_1=255$, $D_2=d_1+d_2-255$ where $d_1$ and $d_2$ denote the non-processed input image data (eight-bit data) of nearby dots, and $D_1$ and $D_2$ denote the processed image data of the same (eight-bit data). The processed eight-bit data $D_1$ and $D_2$ are used as a write signal for driving the LD. The procedures 1–3 for implementing the dot formation algorithm will be described in detail hereinafter.

(Procedure 5)

1) The densities of two nearby dots in the main scanning direction are added;

2) A pulse begins to be generated at the portion "1" of the dot matrix;

3) The PWM right and left phases are switched so as to form dots from the outside of each pixel and connect pulses; and 4) One dot is divided into half pulses, and PWM for the next number is generated when one dot reaches the full condition (50% duty).

Figure 26:
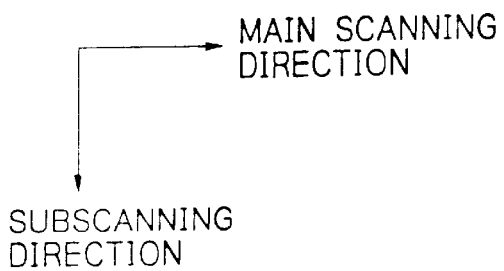
FIG. 26 is a view showing a minimum density unit included in the matrix of the procedure 5.

In the procedure 5, two nearby pixels in the main scanning direction form a 2×1 matrix or minimum pixel, and a highlight portion is reproduced in a zigzag dot pattern. FIG. 26 shows a minimum density unit included in the matrix of FIG. 25. As shown, a pulse is generated in the right phase in $D_1$ and in the left phase in $D_1'$. As a result, pulses appearing in the portions "1" in FIG. 25 are connected to each other (see FIG. 27A). This is repeated to sequentially generate pulses in the portions "2" and successive portions of FIG. 25 in accordance with density.

Figure 27A:
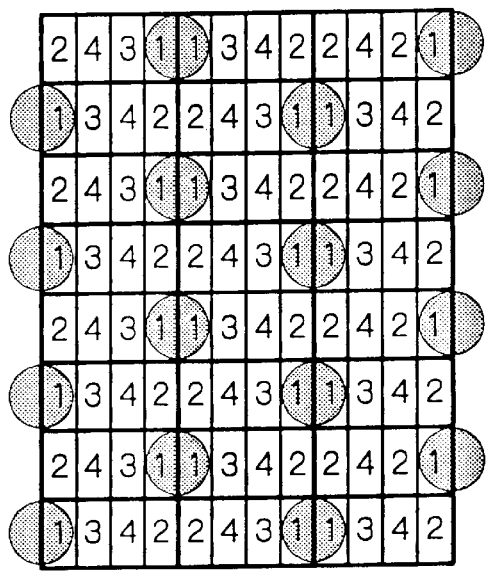
FIGS. 27A–27D are views demonstrating how the procedure 5 forms dots.
Figure 27B:
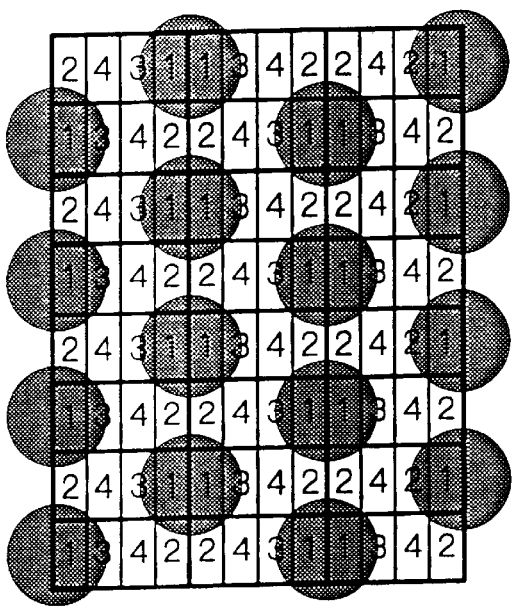
Figure 27C:
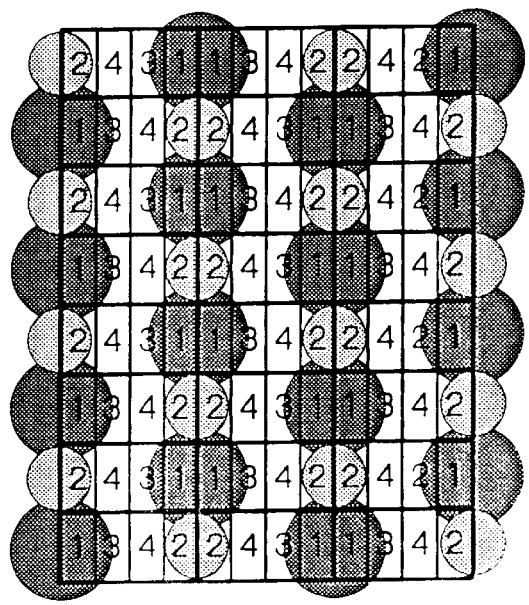
Figure 27D:
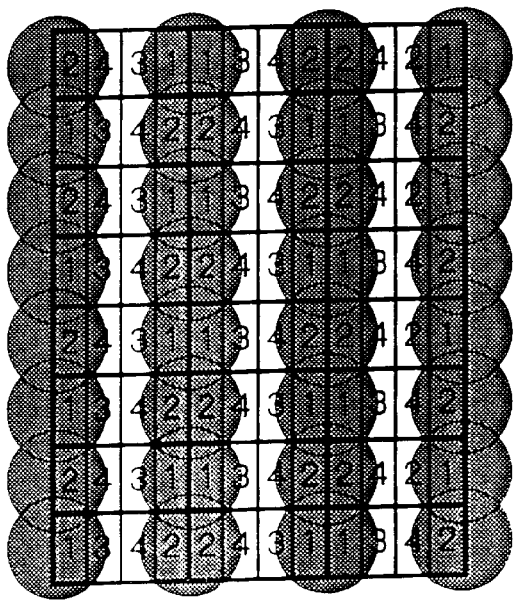

The procedure 5 will be described more specifically with reference to FIGS. 27A–27D and 28A–28C. As shown in FIG. 27A, when the density is up to ⅛ (one solitary dot), connected pulses are generated in the nearby portions "1" of the matrix while being shifted to the right in the odd pixel in the main scanning direction and shifted to the left in the even pixel. As shown in FIG. 27B, when the density is between ⅛ and ¼ (one solitary dot), the pulse width is increased to such a degree that the connected pulses of the portions "1" each reach the full condition (50% duty). As shown in FIG. 27C, when the density is between ¼ and ⅜ (300 line dots), connected pulses arc generated in the portions "2" from the outside of the pixels. As shown in FIG. 27D, when the density is between 3/8 and 1/2 (300 line dots), the pulse width is increased to such a degree that the connected pulses connected in the portions "2" each reach the full condition (50% duty).

Figure 28A:
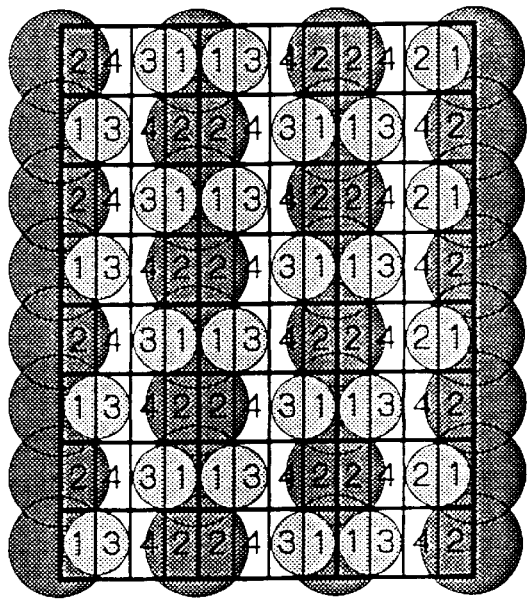
FIGS. 28A–28C are views also showing how the procedure 5 forms dots.
Figure 28B:
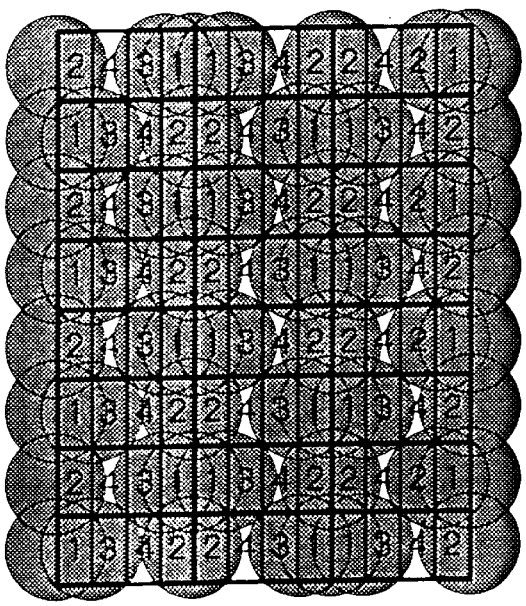
Figure 28C:
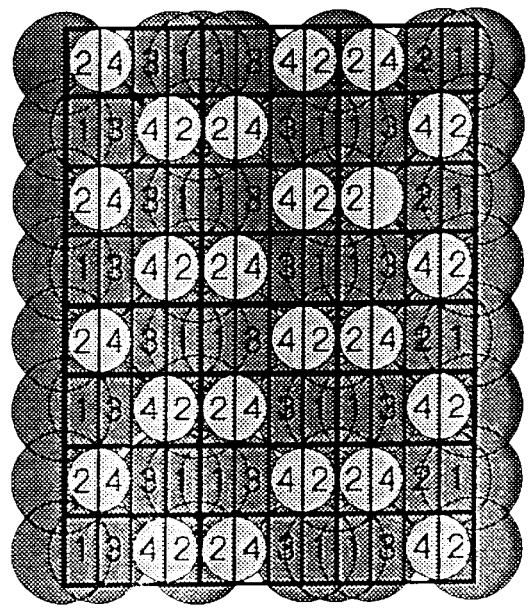

As shown in FIG. 28A, when the density is between 1/2 and 5/8, connected pulses are generated in the portions "3" so as to increase the pulse width in the portions "1". As shown in FIG. 28B, when the density is between 5/8 and 3/4, the pulse width is increased to such a degree that the connected pulses in the portions "3" each reach the 50% duty. As shown in FIG. 28C, when the density is between 3/4 and 7/8, connected pulses are generated in the portions "4" so as to increase the pulse width of the portions "2". Further, when the density is between 7/8 and 1/1, the pulse width is increased to such a degree that the connected pulses in the portions "4" each reach the 50% duty.

With the above procedure 5, it is possible to regularly reproduce an image in a highlight portion with solitary dots having a zigzag pattern, to implement 300 line dots (600 dpi) in a medium density range, to implement linear tonality in the solitary dot, vertical line dots growth system% and to enhance potential concentration and increase the saturation range for guaranteeing stability and resistance to banding.

[D] Addition of Four Dots in Main Scanning Direction (1/2 Pulse Division): Procedure 6

A procedure 6 adds four dots of image data in a highlight portion whose density is below 1/4 or adds two dots of image data contiguous in the main scanning direction in each of a highlight portion following the above highlight portion, a medium portion and a shadow portion.

Figure 29A:
FIGS. 29A and 29B are views respectively showing a single dot size and a single pixel size (minimum density unit) particular to a procedure 6 of the present invention and applicable to a highlight portion having densities below ¼.
Figure 29B:
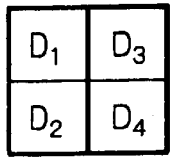
Figure 30:
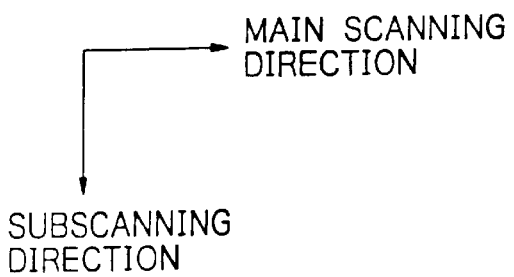
FIG. 30 is a view showing a dot formation matrix particular to the procedure 6.

FIGS. 29A and 29B respectively show a single dot size and a single pixel size applicable to densities below 1/4. FIG. 30 shows a dot formation matrix. Again, a pulse begins to be generated at a portion of the matrix to which the smallest number is assigned. At this instant, one dot is divided into half pulses by PWM. When one dot becomes full (50% duty), the operation advances to the same number or a greater number and generates the next pulse The PWM right and left phases are switched by E/O in the main scanning direction, so that pulses are connected in the direction in which nearby numbers are identical. FIG. 31 shows a minimum density unit included in the matrix of FIG. 30. As shown, a pulse is generated in the right phase in $D_1$ and in the left phase in $D_1'$. As a result, pulses appearing in the portions "1" in FIG. 30 are connected to each other (see FIG. 34A). This is repeated to sequentially generate pulses in other portions "1" of FIG. 30 in accordance with density. The algorithm for density generation is expressed as:

when $0 \leq d_1+d_2+d_3+d_4 \leq 127$ $D_1 = d_1+d_2+d_3+d_4$, $D2=D3=D4=0$ when $128 \leq d_1+d_2+d_3+d_4 \leq 254$ $D_1=127$, $D_2=d_1+d_2+d_3+d_4-127$, $D_3=D_4=0$ where $d_1$, $d_2$, $d_3$ and $d_4$ denote the non-processed input image data (eight-bit data) of nearby dots, and $D_1$, $D_2$, $D_3$ and $D_4$ denote the processed image data of the same (eight-bit data). The processed eight-bit data $D_1$–$D_4$ are used as a write signal for driving the LD.

When the density is above 1/4, two-dot addition is selected on the basis of the dot size of FIG. 29A and a single pixel size (minimum density unit) of FIG. 32. FIG. 33 shows a minimum density unit included in the matrix of FIG. 30. As shown, a pulse is generated in the left phase in $D_2$ and in the right phase in $D_2$. As a result, pulses appearing in the portions "2" in FIG. 30 are connected to each other (see FIG. 35A). This is repeated to sequentially generate pulses in the portions "3" of FIG. 30 in accordance with density. The algorithm for density generation is as follows.

When $d_1+d_2+d_3+d_4+254$ holds with the pixel size of FIG. 29B, $D_1=D_2=127$ holds. Therefore, when the pixel size of FIG. 29B is replaced with the pixel size of FIG. 33, if $d_1+d_2=127$, $D_1$ is 127 while $D_2$ is 0. In the subsequent conditions, the following relations hold:

when $128 \leq d_1+d_2 \leq 382$ $D_1=d_1+d_2-127$, $D_2=127$ when $382 \leq d_1+d_2 \leq 510$ $D_1=255$, $D_2=d_1+d_2-255$ The dot formation algorithm of the procedure 6 will be described more specifically hereinafter.

1) The densities of four dots contiguous in the main and subscanning directions or the densities of two nearby dots in the main scanning direction are added;

2) A pulse begins to be generated at the portion "1" of the dot matrix;

3) The PWM right and left phases are switched so as to form a dot from the outside of each pixel and connect pulses; and 4) One dot is divided into half pulses, and PWM for the same number or the next number is generated when the full condition (50% duty) is reached.

Figure 34A:
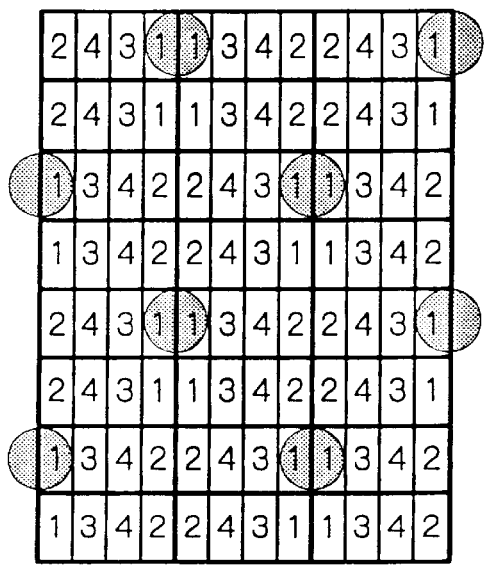
FIGS. 34A–34D are view showing how the procedure 6 forms dots when density is below ¼.
Figure 34B:
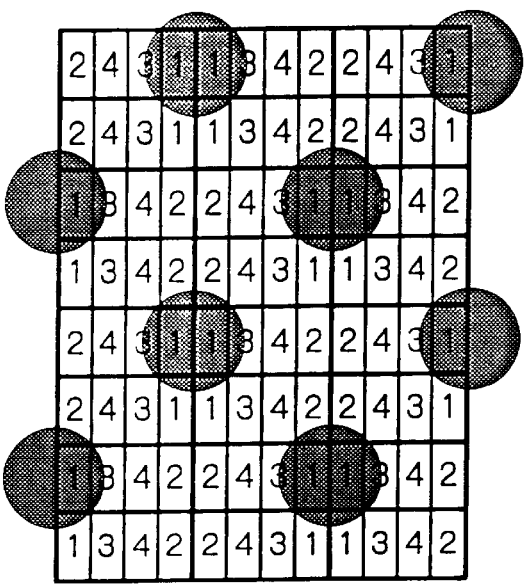
Figure 34C:
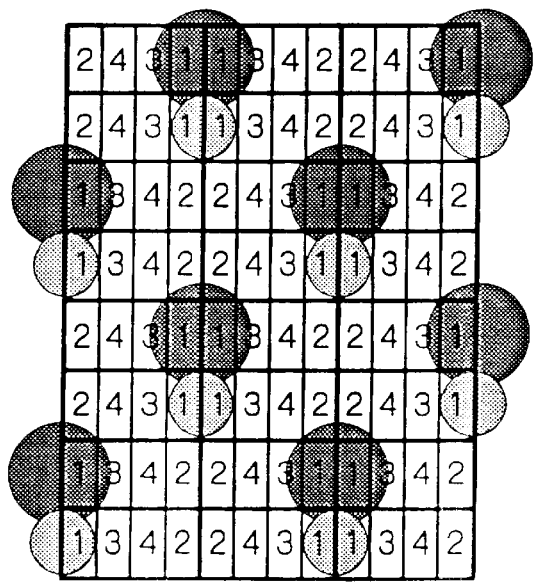
Figure 34D:
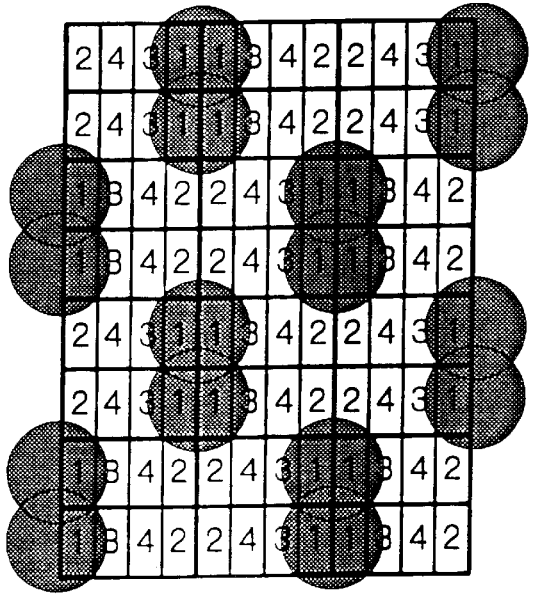

Dot formation available with the procedure 6 will be described in detail with reference to FIGS. 34A–34D, 35A–35D and 38. First, assume that the density is below 1/4. As shown in FIG. 34A, when the density is up to 1/16 (one solitary dot), the density data of four nearby dots are added, and solid dots are generated from the upper portions "1" of the pixels. As shown in FIG. 34B, when the density is between 1/16 and 1/8 (one solitary dot), the densities of four nearby dots are added, and the pulse width is increased to such a degree that the upper portions "1" saturate (full or 50% duty). As shown in FIG. 34C, when the density is between 1/8 and 3/16 two solitary dots), the density data of nearby four dots are added, and the remaining dots are generated in the lower portions "1" of the pixels after the saturation of the upper portions "1". As shown in FIG. 34D, when the density is between 3/16 and 2/8 (two solitary dots), the density of four nearby dots are added, and the pulse width is increased to such a degree that the lower portions "1" saturate (full or 50% duty).

Figure 35A:
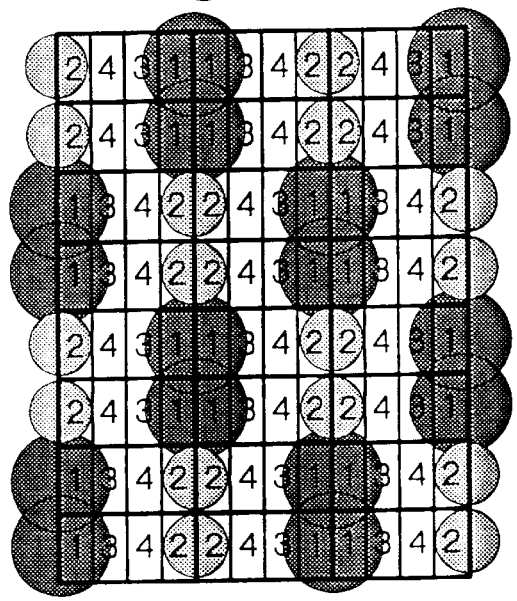
FIGS. 35A–35D are views showing how the procedure 6 forms dots when density is above ¼.
Figure 35B:
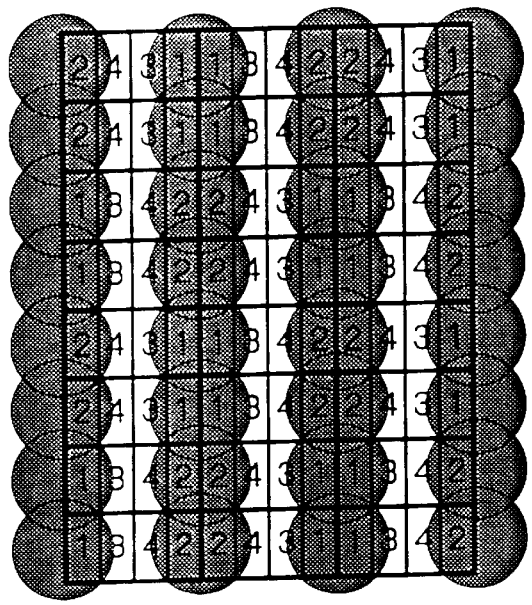
Figure 35C:
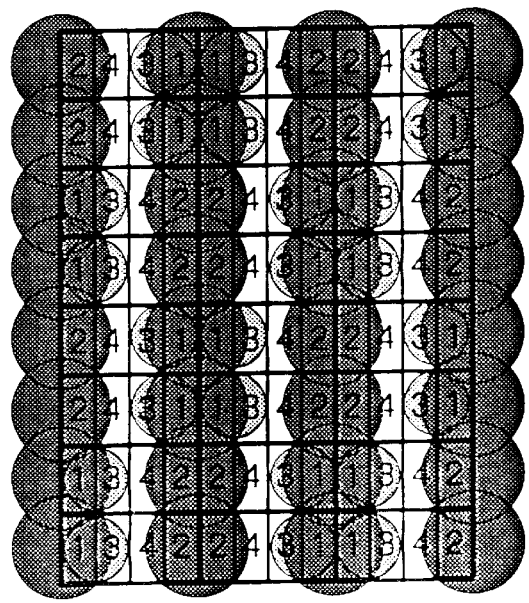
Figure 35D:
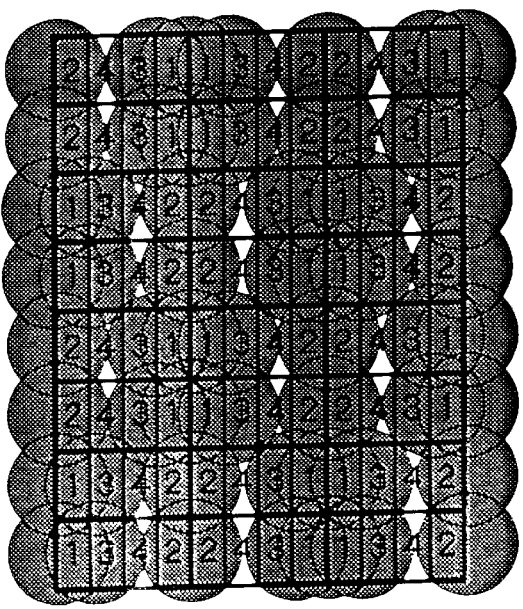
Figure 36:
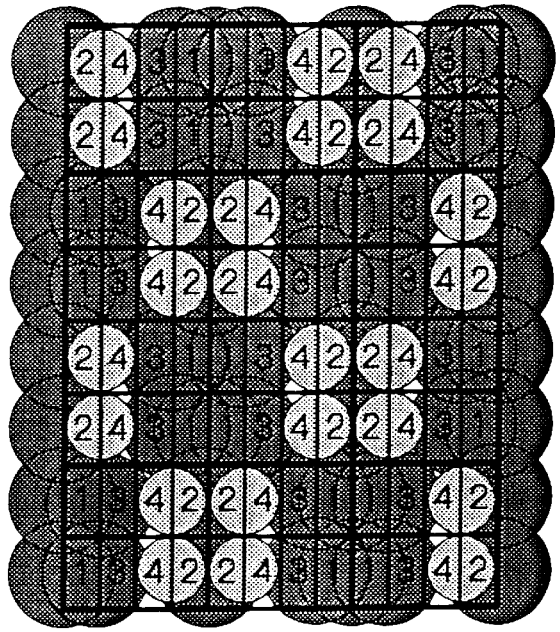

Next, assume that the density is above 1/4. As shown in FIG. 35A, when the density is up to 3/8 (300 line dots), pulses connected to the portions "2" from the outside of the pixels are generated. As shown in FIG. 35B, when the density is between 3/8 and 1/2 (300 line dots), the pulse width is increased to such 8 degree that the connected pulses in the portions "2" each reach the 50% duty. As shown in FIG. 35C, when the density is between 1/2 and 5/8, connected pulses are generated in the portions "3" so as to increase the pulse width in the portions "1". As shown in FIG. 35D, when the density is between 5/8 and 3/4, the pulse width is increased to such a degree that the connected pulses in the portions "3" each reach the 50% duty. As shown in FIG. 36, when the density is between 3/4 and 7/8, connected pulses are generated in the portions "4" in order to increase the pulse width of the portions "2". Further, when the density is between 7/8 and 1/1, the pulse width is increased to such a degree that the connected pulses in the portions "4" each reach the 50% duty.

As stated above, the procedure 6 adds, in a highlight portion having densities below ¼, the densities of four dots in order to arrange solitary dots in a zigzag pattern or adds, in a highlight portion to a shadow portion having densities above ½, the image data of two nearby dots in the main scanning direction in order to arrange two dots in a zigzag pattern. The procedure 6 therefore reproduces a low density portion to a highlight portion more desirably than the procedure 5.

[E] Another Procedure: Procedure 7

Assume that any one of the above procedures 1–6 reaches 300 line dots which is tho medium density. Then, for data above the medium density, a pulse width is evenly added to the portions "3" and "4" so as to increase the pulse width of the portions "1" and "2". Consequently, the line image of line dots sequentially fattens. This is successful to maintain a line-dot configuration which is ever and attractive particularly in a high density portion.

In summary, the first embodiment shown and described achieves various unprecedented advantages, as enumerated below.

(1) The embodiment adds the image data of a plurality of dots, starts generating a density from a particular pixel, and switches PWM right and left phases in order to concentrate potentials and to increase a saturation region. It is therefore possible to stabilize image density in a highlight portion and therefore realize high quality images, while reducing banding and image noise.

Figure 37A:
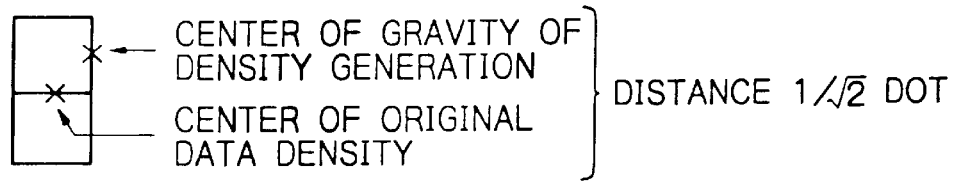
FIGS. 37A and 37B are views respectively showing the center of gravity of density of dots contiguous in the subscanning direction and added together and that of output data and the center of gravity of density of dots contiguous in the main scanning direction and that of output data.
Figure 37B:
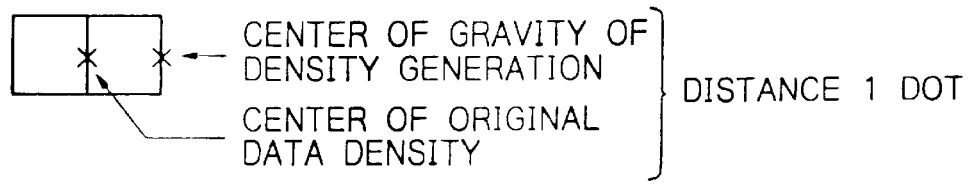

(2) When nearby dots in the subscanning direction are added, the result of density generation of the particular pixel is more faithful to the center of gravity of density of original data than when nearby dots in the main scanning direction are added. Specifically, as shown in FIG. 37A, when nearby image data in the subscanning direction are added, a dot begins to appear at a position diagonal to the center of gravity of original two dots of data, so that the distance is a $1\sqrt{2}$ dot. By contrast, when nearby image data in the main scanning direction are added, a dot begins to appear at an end opposite to the center of gravity of original two dots of data, so that the distance corresponds to one dot.

(3) Optical writing signals are connected in the main scanning direction by the adequate switching of the PWM right and left phases. This allows solitary dots to be reproduced in the main scanning direction and promotes potential concentration and increases saturation region, thereby enhancing stability in a highlight portion.

(4) A density begins to be generated in a particular direction of a particular pixel. After the density of the particular pixel has reached a preselected reference density, e.g., when one dot saturates and stabilizes dot reproduction, a density for the next particular pixel is generated. Consequently, nearby dots in the main scanning direction are connected particularly in a highlight portion, forming a solitary dot and thereby rendering an image stable.

Advantages achievable with the second are as follows.

(1) Assume that a plurality of dots of image data are added in the subscanning direction, and that a density begins to be generated at a particular pixel. Then, by adequately arranging particular pixels for generating densities, it is possible to reproduce dots connected in the subscanning direction and to promote potential concentration and increase the saturation range. This is also successful to stabilize an image particularly in a highlight portion. Specifically, the potential distribution of a photoconductive element exposed by a solitary dot generally forms a peak around the dot and is unstable at its skirt portions. By connecting exposed dots, it is possible to cause the potential to saturate at the connected portion and remain stable.

(2) After the minimum dot density data of the particular pixel has saturated, a density for the next particular pixel is generated. This guarantees saturation and stability.

(3) The addition of nearby dots and the density generation from the particular pixel are entirely executed on the same main scanning line and can be done without resorting to a line buffer memory, compared to the addition of nearby dots in the subscanning direction. This successfully saves cost. In addition, this embodiment also achieves the advantage (2) of the first embodiment.

Advantages achievable with the third embodiment are as follows.

(1) In the advantage (1) described in relation to the first embodiment, a great amount of image data concentrate in a low density portion or highlight portion, among others. This insures stable tonality reproduction. In a medium and a high density portion, a small amount of data concentrate with priority being given to resolution. Consequently, an image can be adequately reproduced from low density to high density.

(2) The embodiment also adds image data of a plurality of dots, starts generating a density from a particular pixel, and switches PWM right and left phases in order to concentrate potentials and to increase a saturation region. It is therefore possible to reduce banding and image noise in a highlight portion, to stabilize image density, and implement a high quality image. Particularly, in a highlight portion, the embodiment adds four nearby dots of image data and starts generating a density from a particular pixel, further enhancing potential concentration and increasing the saturation region. This is successful to start reproducing the dots of a highlight portion at a lower density.

(3) Because nearby pixels for generating densities are spaced from each other by a distance corresponding to one or more dots in the main scanning direction, stability is enhanced particularly in a highlight portion for the same reason as described in relation to the advantage (1) of the second embodiment. This also holds when the distance between nearby pixels in the subscanning direction corresponds to one or more pixels.

(4) In a highlight portion, solitary dots are arranged zigzag in both of the main and subscanning directions while, in a medium density portion, they are arranged in line dots. An image can therefore be regularly produced without any texture. Further, the growth from zigzag dots to linedots successfully reproduces smooth tonality over the entire density range without any reversal or the like.

(5) In a low density portion, among others, nearby reproduced dots have a zigzag distribution, i.e., do not adjoin each other, enhancing stability. Peak-like potential distributions of exposed dots are prevented from overlapping at skirt portions in the main or subscanning direction, obviating unstable potential portions. This embodiment also achieves the advantage (2) of the first embodiment.

Advantages achievable with the fourth embodiment of the present invention are as follows.

(1) In the advantage (1) described in relation to the first embodiment, the pulse width of a particular pixel in the subscanning direction is increased in the opposite direction to the previous line so as to scatter reproduced dots in a high density portion. This renders the local omission of an image, particularly a split character, inconspicuous.

(2) Particularly, in a high density portion, when the arrangement of reproduced dots is repeated over two or more lines in the subscanning direction, the white portion of paper can exist up to the high density portion. This enhances the area tonality effect and guarantees tonality in a high density portion.

(3) Because the pulse width is evenly increased around a line-dot image, attractive line dots configuration can be preserved even in a high density portion. In addition, tonality increases with high linearity in medium and higher density portions.

(4) Before the particular pixel reaches the saturation density, a density is generated for another particular pixel so as to scatter reproduced dots in a medium and a high density portion This makes local omission inconspicuous and enhances resolution. Improved resolution is particularly desirable when it comes to characters generally having high densities. This embodiment also achieves the advantage (2) of the first embodiment.

Various modifications will become possible for those skilled in the art after receiving the teachings of the present disclosure without departing from the scope thereof.

What is claimed is:

1. An apparatus for forming an image by modulating a multilevel image signal, comprising:
   optical writing means for executing optical modulation including at least PWM (Pulse Width Modulation);
   calculating means for performing a calculation with image data of nearby pixels;
   density generating means for generating a density from a particular pixel portion of a plural portion pixel on the basis of data output from said calculating means;
   first replacing means for replacing the particular pixel portion in a main scanning direction; and
   second replacing means for replacing the particular pixel portion in a subscanning direction.

2. An apparatus for forming an image by modulating a multilevel image signal, comprising:
   optical writing means for executing optical modulation including at least PWM;
   adding means for adding image data of nearby pixels;
   density generating means for generating a density from a particular pixel portion of a plural portion pixel on the basis of data output from said adding means; and
   replacing means for replacing the particular pixel portion in a main scanning direction to thereby connect optical writing signals in the main scanning direction.

3. An apparatus for forming an image by modulating a multilevel image signal, comprising:
   optical writing means for executing optical modulation including at least PWM;
   adding means for adding image data of nearby pixels;
   density generating means for time-dividing the nearby pixels and generating, based on data output from said adding means, a density in a particular direction of a particular pixel portion of a plural portion pixel; and
   replacing means for replacing the particular pixel portion in a main scanning direction;
   wherein after the particular pixel portion has reached a preselected density, said density generating means generates a density for a second particular pixel portion of the plural portion pixel.

4. An apparatus for forming an image by modulating a multilevel image signal, comprising:
   adding means for adding image data of nearby pixels;
   density generating means for generating a density from a particular pixel portion of a plural portion pixel on the basis of data output from said adding means; and
   replacing means for replacing the particular pixel portion in a subscanning direction to thereby connect nearby pixels portions in the subscanning direction.

5. An apparatus for forming an image by modulating a multilevel image signal, comprising:
   adding means for adding image data of nearby pixels;
   first density generating means for generating a density from a first particular pixel portion of a plural portion pixel on the basis of data output from said adding means; and
   second density generating means for generating a density for a second particular pixel portion of the plural portion pixel when density data of a minimum dot of the first particular pixel portion saturates.

6. An apparatus for forming an image by modulating a multilevel image signal, comprising;
   optical writing means for executing optical modulation including at least PWM;
   adding means for adding image data of nearby pixels in a main scanning direction; and
   density generating means for generating, based on data output from said adding means, a density from a particular position of a particular pixel portion of a plural portion pixel.

7. An apparatus for forming an image by modulating a multilevel image signal, comprising:
   optical writing means for executing optical modulation including at least PWM;
   adding means for adding image data of nearby pixels in a subscanning direction; and
   density generating means for generating, based on data output from said adding means, a density from a particular position of a particular pixel portion of a plural portion pixel.

8. An apparatus for forming an image by modulating a multilevel image signal, comprising;
   adding means for adding image data of nearby pixels;
   first density generating means for generating a density from a particular pixel portion of a plural portion pixel on the basis of data output from said adding means;
   second density generating means for adding, when the data output from said adding means is below a preselected density, data of a first number of nearby pixels and generating a density from the particular pixel portion in accordance with resulting sum data; and
   third density generating means for adding, when the data output from said adding means is above the preselected density, data of a second number of pixels smaller than the first number of pixels and generating a density from the particular pixel portion in accordance with resulting sum data.

9. An apparatus for forming an image by modulating a multilevel image signal, comprising
   optical writing means for executing optical modulation including at least PWM;
   adding means for adding image data of nearby pixels;
   first density generating means for generating a density from a particular pixel portion of a plural portion pixel on the basis of data output from said adding means;
   second density generating means for adding, when the data output from said adding means is below a preselected density, four nearby dots and generating a density from the particular pixel portion in accordance with resulting sum data; and third density generating means for adding when the data output from said adding means is above the preselected density, two nearby dots and generating a density from the particular pixel portion in accordance with resulting sum data.

10. An apparatus for forming an image by modulating a multilevel image signal, comprising:
   optical writing means for executing optical modulation including at least PWM;
   adding means for adding image data of nearby pixels;
   density generating means for generating a density from a particular pixel portion of a plural portion pixel on the basis of data output from said adding means; and
   replacing means for replacing the particular pixel portion in a main scanning direction;
   wherein a distance between particular pixel portions corresponds to one or more dots.

11. An apparatus for forming an image by modulating a multilevel image signal, comprising:
   optical writing means for executing optical modulating including at least PWM;
   adding means for adding image data of nearby pixels;
   density generating means for generating a density from a particular pixel portion of a plural portion pixel on the basis of data output from said adding means; and
   replacing means for replacing the particular pixel portion in a subscanning direction;
   wherein a distance between particular pixel portions corresponds to one or more lines.

12. An apparatus for forming an image by modulating a multilevel image signal, comprising:
   optical writing means for executing optical modulation including at least PWM;
   adding means for adding image data of nearby pixels in a main scanning direction;
   first density generating means for generating a density from a particular pixel portion of a plural portion pixel on the basis of data output from said adding means;
   second density generating means for time-dividing the nearby pixels and generating a density in a particular direction of the first particular pixel portion on the basis of data output from said adding means;
   first replacing means for replacing a density generating position in the main scanning direction;
   connecting means for connecting optical writing signals in the main scanning direction;
   shifting means for shifting, when the particular pixel portion reaches a preselected density, generation of a density to a second particular pixel portion of the plural portion pixel; and
   second replacing means for replacing the particular pixel portion in a subscanning direction to thereby shift the particular pixel portion in the subscanning direction.

13. An apparatus for forming an image by modulating a multilevel image signal, comprising:
   optical writing means for executing optical modulation including at least PWM;
   calculating means for performing calculation with image data of nearby pixels;
   density generating means for generating a density from a particular pixel portion of a plural portion pixel on the basis of data output from said calculating means;
   first replacing means for replacing the particular pixel portion in a main scanning direction; and
   second replacing means for replacing the particular pixel portion in a subscanning direction;
   wherein a low density portion has a zigzag dot distribution in which dots do not adjoin each other.

14. An apparatus for forming an image by modulating a multilevel image signal, comprising:
   optical writing means for executing optical modulation including at least PWM;
   adding means for adding image data of nearby pixels;
   density generating means for generating a density from a particular pixel portion of a plural portion pixel on the basis of data output from said adding means;
   replacing means for replacing the particular pixel portion in a main scanning direction;
   connecting means for connecting optical writing signals in the main scanning direction;
   line image forming means for forming a line image by repeating connection of the optical writing signals in a subscanning direction; and
   pulse width increasing means for increasing a pulse width of the particular pixel portion of the line image;
   wherein on a next line in the subscanning direction, a width of the particular pixel portion of the line image in an opposite direction is increased.

15. An apparatus for forming an image by modulating a multilevel image signal, comprising:
   optical writing means for executing optical modulation including at least PWM;
   adding means for adding image data of nearby pixels;
   density generating means for generating a density from a particular pixel portion of a plural portion pixel on the basis of data output from said adding means;
   replacing means for replacing the particular pixel portion in a main scanning direction;
   connecting means for connecting optical writing signals in the main scanning direction;
   line image forming means for forming a line image by repeating connection of the optical writing signals in a subscanning direction; and
   pulse width increasing means for increasing a pulse width of the particular pixel portion on the line image;
   wherein the pulse width is increased over two or more lines in the subscanning direction.

16. An apparatus for forming an image by modulating a multilevel image signal, comprising:
   optical writing means for executing optical modulation including at least PWM;
   adding means for adding image data of nearby pixels;
   density generating means for generating a density from a particular pixel portion of a plural portion pixel on the basis of data output from said adding means;
   replacing means for changing the particular pixel portion in a main scanning direction;
   connecting means for connecting optical writing signals in the main scanning direction;
   line image forming means for forming a line image by repeating connection of the optical writing signals in a subscanning direction; and
   pulse width increasing means for increasing a pulse width of the line image;
   wherein the pulse width is evenly increased around the line image.

17. An apparatus for forming an image by modulating a multilevel image signal, comprising:

optical writing means for executing optical modulation including at least PWM;

adding means for adding image data of nearby pixels;

density generating means for generating a density from a first particular pixel portion of a plural portion pixel on the basis of data output from said adding means;

replacing means for replacing the first particular pixel portion in a main scanning direction;

first connecting means for causing said replacing means to connect optical writing signals in the main scanning direction;

second generatiing means for continuously generating a density, in a subscanning direction, from pixel portions to thereby connect nearby pixels in the subscanning direction;

first pulse width increasing means for increasing a pulse width of the first pixel portion before a density of a second pixel portion of the plural portion pixel saturates; and second pulse width increasing means for increasing a pulse width of the second pixel portion before the first pulse width becomes continuous.

* * * * *